(12) United States Patent
Tanaka et al.

(10) Patent No.: US 7,467,199 B2
(45) Date of Patent: Dec. 16, 2008

(54) INTEGRATED MANAGEMENT SYSTEM UTILIZING E-MAIL FOR REMOTELY MONITORING/CONTROLLING OVER THE INTERNET

(75) Inventors: Katsumi Tanaka, Kawasaki (JP); Tomonori Gotoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 761 days.

(21) Appl. No.: 10/340,550

(22) Filed: Jan. 10, 2003

(65) Prior Publication Data

US 2003/0126221 A1    Jul. 3, 2003

Related U.S. Application Data

(63) Continuation of application No. PCT/JP00/04603, filed on Jul. 10, 2000.

(51) Int. Cl.
G06F 15/16 (2006.01)
G06F 15/173 (2006.01)
G06F 15/177 (2006.01)

(52) U.S. Cl. ..................... 709/224; 370/408

(58) Field of Classification Search ............. 709/224, 709/200–203, 217–228, 229–232, 236–245, 709/246–250; 718/100, 104, 105; 719/310–318; 370/308

See application file for complete search history.

(56) References Cited

U.S. PATENT DOCUMENTS 5,651,006 A * 7/1997 Fujino et al. ............... 370/408

| | | | |
|---|---|---|---|
| 5,805,819 A * | 9/1998 | Chin et al. ................ 709/224 |
| 5,968,124 A | 10/1999 | Takahashi et al. |
| 6,061,723 A * | 5/2000 | Walker et al. ............. 709/224 |
| 6,470,386 B1 * | 10/2002 | Combar et al. ............ 709/224 |
| 6,611,866 B1 * | 8/2003 | Goldman .................. 709/224 |
| 6,654,801 B2 * | 11/2003 | Mann et al. ............... 709/224 |
| 6,662,225 B1 * | 12/2003 | Motoyama et al. ........ 709/224 |
| 6,714,977 B1 * | 3/2004 | Fowler et al. ............. 709/224 |
| 6,832,250 B1 * | 12/2004 | Coons et al. .............. 709/224 |
| 2002/0169867 A1 * | 11/2002 | Mann et al. ............... 709/224 |

FOREIGN PATENT DOCUMENTS

| JP | 6-205011 | 7/1994 |
| JP | 9-134297 | 5/1997 |
| JP | 11-150532 | 6/1999 |
| JP | 11-234273 | 8/1999 |
| JP | 2000-151604 | 5/2000 |
| JP | 2000-209204 | 7/2000 |

OTHER PUBLICATIONS

IEEE/IFIP 1998 Network Operations and Management Symposium pp. 303-3123, A. Liotta, et al. "Modelling Network and System Monitoring Over the Internet With Mobile Agents" vol. 2.

* cited by examiner

*Primary Examiner*—Haresh N Patel
(74) *Attorney, Agent, or Firm*—Katten Muchin Rosenman LLP

(57) ABSTRACT

A network integrated management system transferring monitor/control information by e-mail using the Internet (40) between a monitor/control apparatus (50) having a network (14) to be monitored and controlled under it and a network integrated management apparatus (30) integratedly managing the network through the monitor/control apparatus.

15 Claims, 23 Drawing Sheets

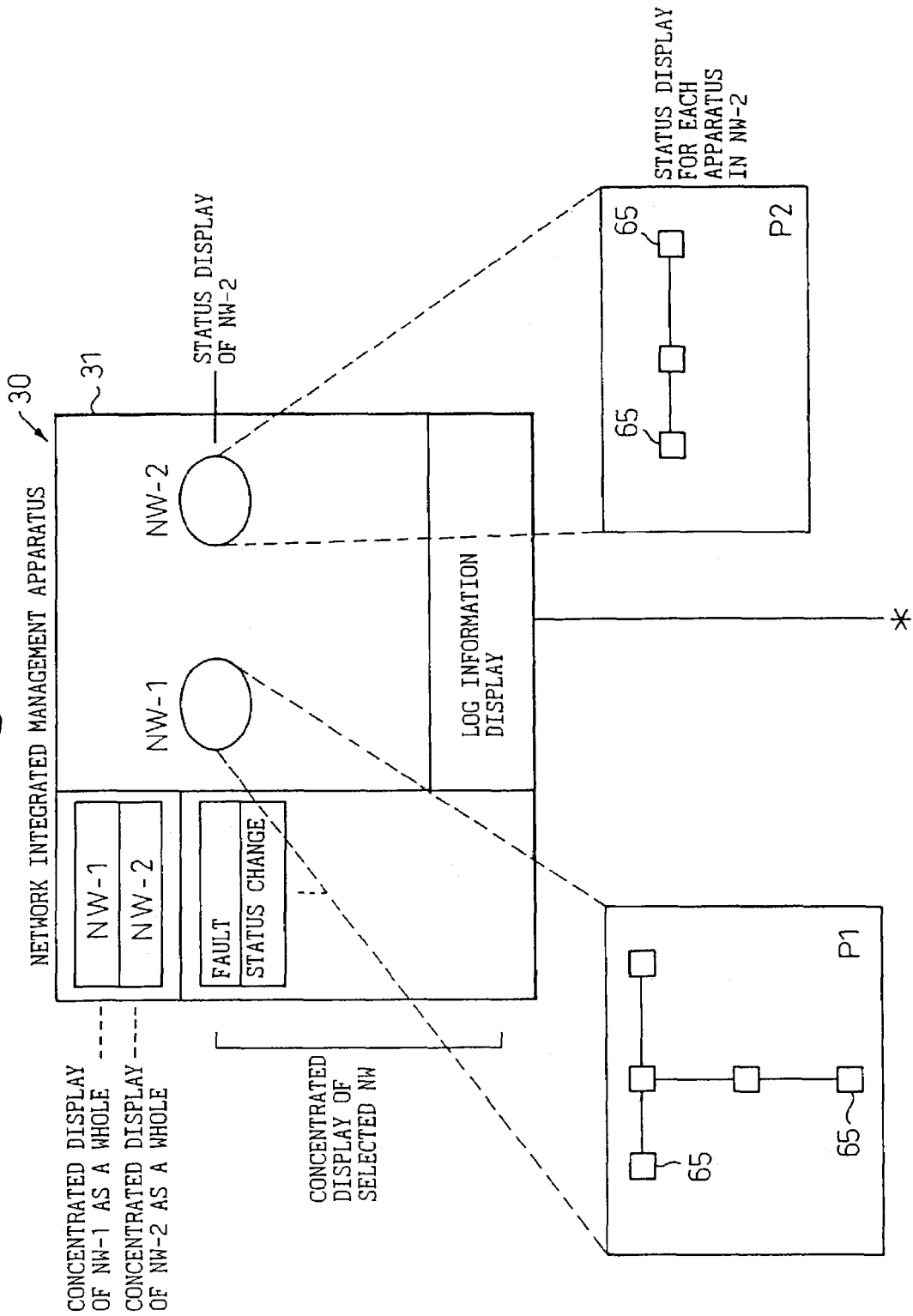

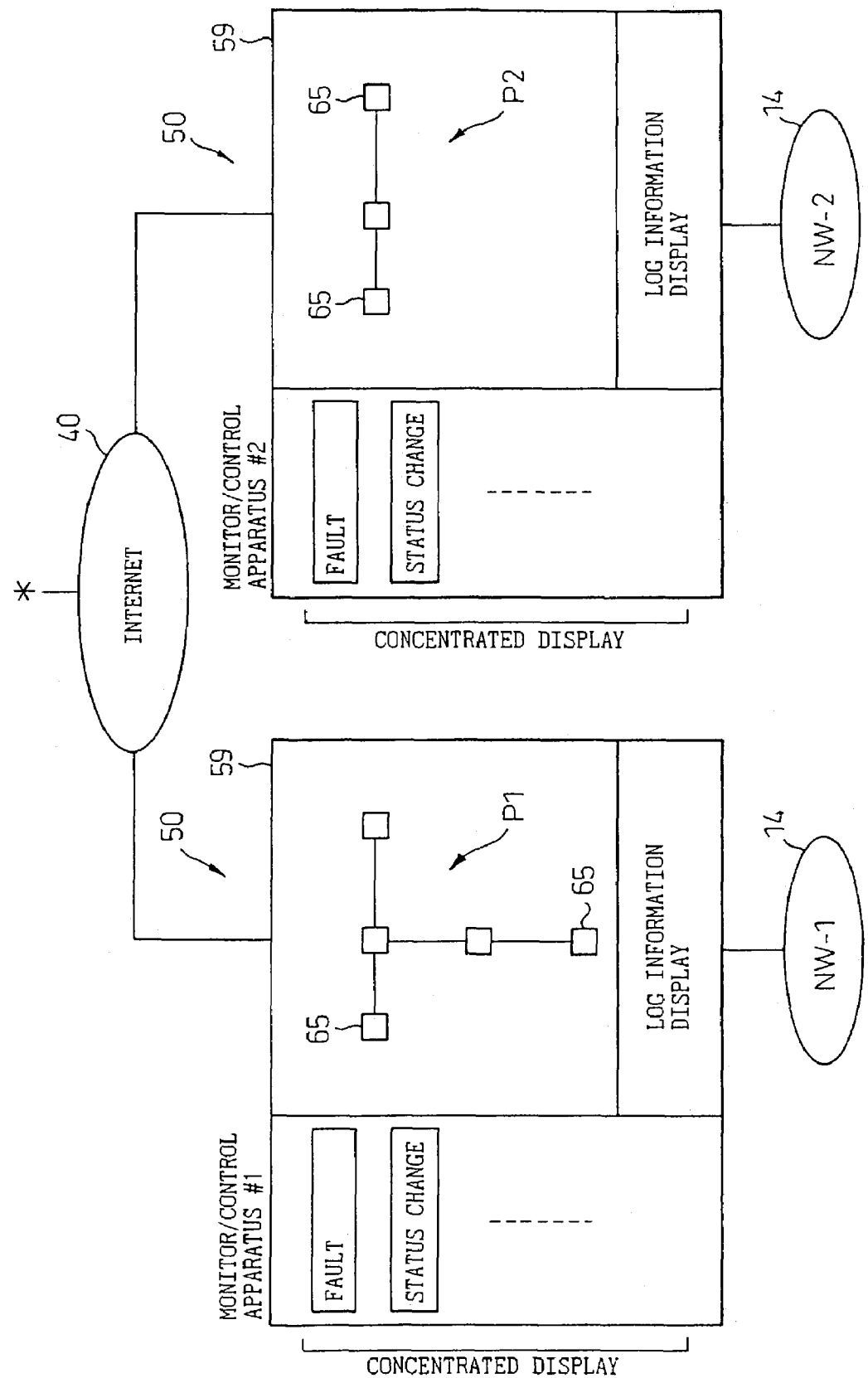

Fig.6

(A) NOTIFICATION INFORMATION LIST  (LOADED IN MONITOR/CONTROL APPARATUS)  54

| NOTIFICATION ITEM | DESTINATION ADDRESS | |
|---|---|---|
| STATUS CHANGE NOTIFICATION | master@host1.aaa.. <br> master@host2.bbb.. <br> master@host3.ccc.. | |
| DISPLAY INFORMATION NOTIFICATION | master@host1.aaa.. <br> master@host2.bbb.. <br> master@host3.ccc.. | |
| NETWORK MANAGEMENT RANGE CHANGE NOTIFICATION | master@host1.aaa.. <br> master@host2.bbb.. <br> master@host3.ccc.. | |

(B) HOST LIST  (LOADED IN MONITOR/CONTROL APPARATUS)  54

| HOST NAME | HOST ADDRESS | |
|---|---|---|
| LOCAL <br> GROUP 1 <br> GROUP 2 <br> <br> GROUP 3 <br> GROUP 4 | master@host1.aaa.. <br> master@host2.bbb.. <br> master@host3.ccc.. <br> master@host4.ddd.. <br> master@host5.eee.. <br> master@host6.fff.. | |

(C) HOST LIST  (LOADED IN NETWORK INTEGRATED MANAGEMENT APPARATUS)  32

| HOST NAME | HOST ADDRESS | |
|---|---|---|
| LOCAL <br> GROUP 1 <br> <br> <br> GROUP 2 | usr@host1.aaa.. <br> usr@host2.bbb.. <br> usr@host3.ccc.. <br> usr@host4.ddd.. <br> usr@host5.eee.. <br> usr@host6.fff.. | |

Fig.21

(CASE OF TIME OUT)

② SET MONITOR TIMER FOR NW-1

SETTING OF MONITOR TIMER OCCURS

RETRY OUT ? — No ⇒ TO ②

Yes ↓

DEEM OUT OF SCOPE OF MONITORING

INTEGRATED MANAGEMENT SYSTEM UTILIZING E-MAIL FOR REMOTELY MONITORING/CONTROLLING OVER THE INTERNET

CROSS REFERENCE TO RELATED APPLICATION

This application is a continuation application and is based on PCT/JP00/04603 filed on Jul. 10, 2000.

TECHNICAL FIELD

The present invention relates to a network integrated management system, more particularly to a network integrated management system provided with a plurality of networks, a plurality of monitor/control apparatuses having the plurality of networks under them, and a host apparatus arranged further above these networks and monitor/control apparatuses.

Along with the spread of multimedia, large numbers of local area networks (LAN's) and wide area networks (WAN's) are being constructed. In order to ensure that these networks function normally, monitor/control apparatuses are provided at each of the networks.

If a large number of networks are laid over a wide area, however, that is, if the monitor/control apparatuses accompanying these networks are arranged decentralized over a wide area, then a further higher apparatus is required for monitoring or managing these monitor/control apparatuses as a whole. With the inclusion of this host apparatus for overall monitoring or management, what is constructed is a network integrated management system.

BACKGROUND ART

As explained later with reference to the drawings, a conventional network integrated management system concentrates part of the monitoring information collected by the monitor/control apparatuses of the networks, then notifies it to a single network host monitor apparatus by its own protocol using leased lines or dial-up lines. The network host monitor apparatus provides status information of the networks to an operator based on the notified monitoring information. When a network has to be controlled, this control is performed from the monitor/control apparatus connected to that network.

Such a conventional network integrated management system suffers from the following problems i) to iv).

i) The network host monitor apparatus only collects the monitoring information. Therefore, there is no protocol for control of networks through the monitor/control apparatuses. Accordingly, each network can only be controlled from the monitor/control apparatus of that network. This is extremely inconvenient in network management.

ii) The above network host monitor apparatus can only obtain status information of parts of the states of the networks. Therefore, it cannot acquire further detailed status information in the networks and it is difficult to realize higher quality management.

iii) The above network host monitor apparatus and monitor/control apparatuses have to manage the states of the networks as display information. In this case, the display information naturally has to match between the monitor/control apparatus side and the network host monitor apparatus side. When the monitor/control objects in a network, for example, the node apparatuses, are increased or removed, it is necessary to update the data showing the network configuration and update the above display information at both of the monitor/control apparatus and the network host monitor apparatus. Therefore, the system is remarkably inferior in terms of user friendliness and reliability.

iv) Communication in the network integrated management system is generally usually performed using leased lines or dial-up lines. Network integrated management systems, however, are becoming increasingly larger in size at the present time. The communication costs due to use of leased lines or dial-up lines is therefore remarkably increasing.

DISCLOSURE OF INVENTION

In view of the above problems, the present invention has as its object to provide a network integrated management system i) enabling networks to be monitored and/or controlled not only from the corresponding monitor/control apparatuses, but also a network host monitor apparatus, ii) enabling status information on details of the networks to be obtained from a network host monitor apparatus, iii) able to ensure a constant match of display information of the states of the networks between the network host monitor apparatus and the monitor/control apparatuses, and iv) able to greatly reduce the communications costs.

The present invention proposes a network integrated management system of basically the following configuration to achieve this object.

The network integrated management system is comprised of at least one monitor/control apparatus, at least one network integrated management apparatus, and the Internet.

Each of the at least one monitor/control apparatus has a network to be monitored and controlled under it.

Further, each of the at least one network integrated management apparatus integratedly manages the networks through the monitor/control apparatuses.

Further, monitor/control information is transferred between a monitor/control apparatus and a network integrated management apparatus over the Internet.

Basically, by adopting this configuration, the above object can be achieved. Next, the invention will be explained in detail with reference to the drawings.

BRIEF DESCRIPTION OF DRAWINGS

FIG. 4 is a view of a specific example of display at displays 31 and 59 of FIG. 2 and FIG. 3 (part 1);

FIG. 5 is a view of a specific example of display at displays 31 and 59 of FIG. 2 and FIG. 3 (part 2);

FIGS. 6(A), (B), and (C) are views of specific examples of contents of various lists stored in tables in a managed group information unit;

FIG. 21 is a flow chart (part 2) of operation under the mode 4;

BEST MODE FOR CARRYING OUT THE INVENTION

To clarify the effects caused by the present invention, first the conventional configuration will be simply explained.

Figure 23:
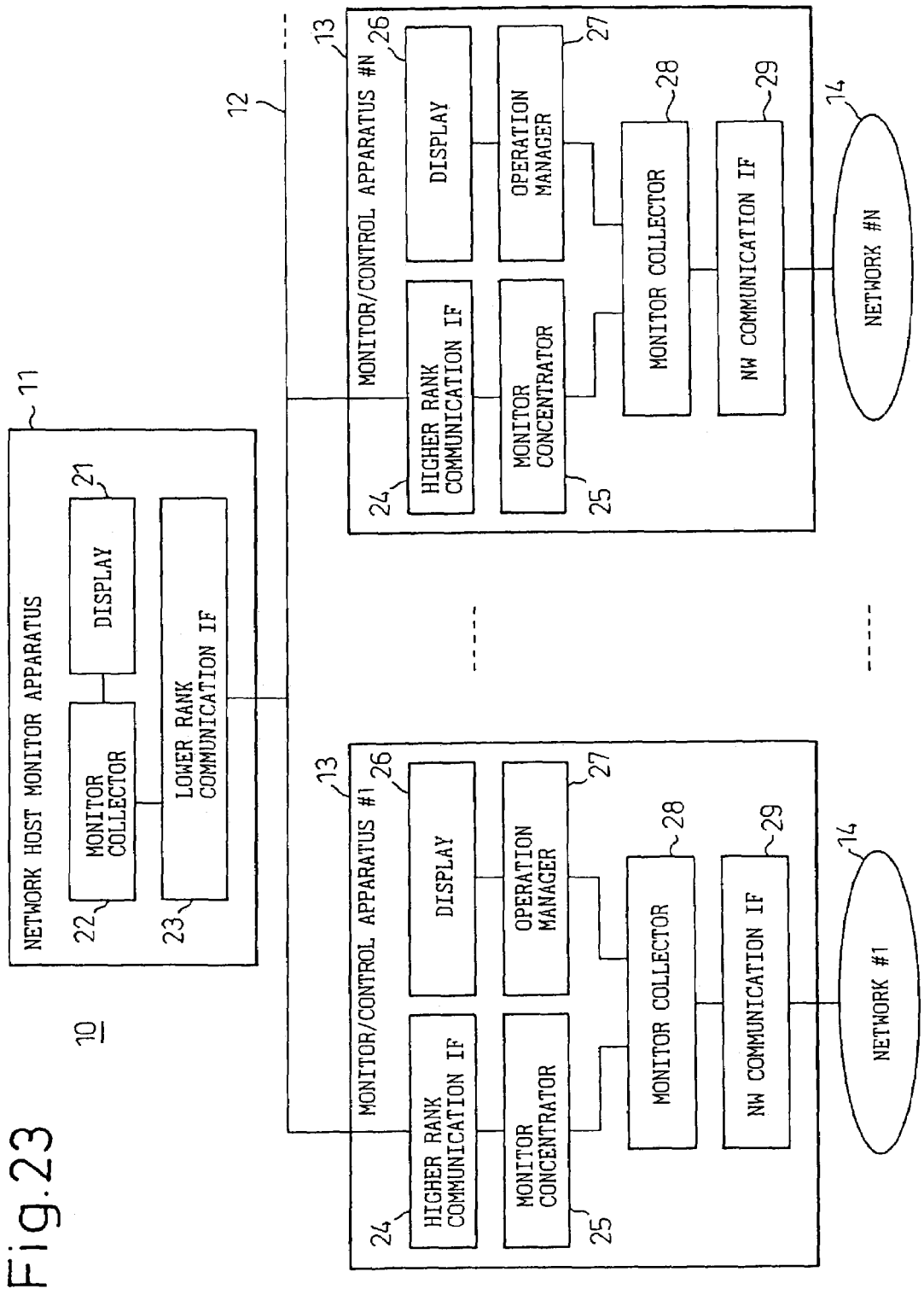
FIG. 23 is a view of a conventional configuration of a network integrated management system.

FIG. 23 is a view of a conventional configuration of a network integrated management system.

In the figure, reference numeral 10 shows a network integrated management system. The system 10 is comprised, from the lower rank layer, of a plurality of networks (#1 to #N) 14, a monitor/control apparatus (#1 to #N) 13 for each of the networks 14, communication lines 12 comprised of leased lines or dial-up lines connecting to the apparatuses 13, and a single network host monitor apparatus 11 for monitoring the apparatuses 13 through the communication lines 12.

In FIG. 23, various type of information from for example the plurality of node apparatuses (not shown) in each network 14 is collected by a monitor collector 28 through a network communication interface (NW communication IF) 29.

The collected information is supplied on the one hand to a monitor concentrator 25 and on the other hand to an operation manager 27. Information relating to operation supplied from the operation manager 27 is given as display information to a display 26. The operator monitors this.

On the other hand, the monitor concentrator 25 selects and summarizes only high priority information in the various type of information collected and sends it through a host communication interface (IF) 24 to the communication line 12.

The sent concentrated information is input through a lower rank communication interface (IF) 23) into the single network host monitor apparatus 11. Therefore, a monitor collector 22 applies predetermined processing, then displays the result on a display 21 to provide that concentrated information to the operator.

In the above network integrated management system 10 of the conventional configuration, the above-mentioned problems arose, that is, the extreme inconvenience in network management, the difficulty in realization of high quality management, the inferiority in aspects of user friendliness and reliability, and the increased communication costs.

The configuration of the present invention for solving these problems will be explained in detail below.

Figure 1:
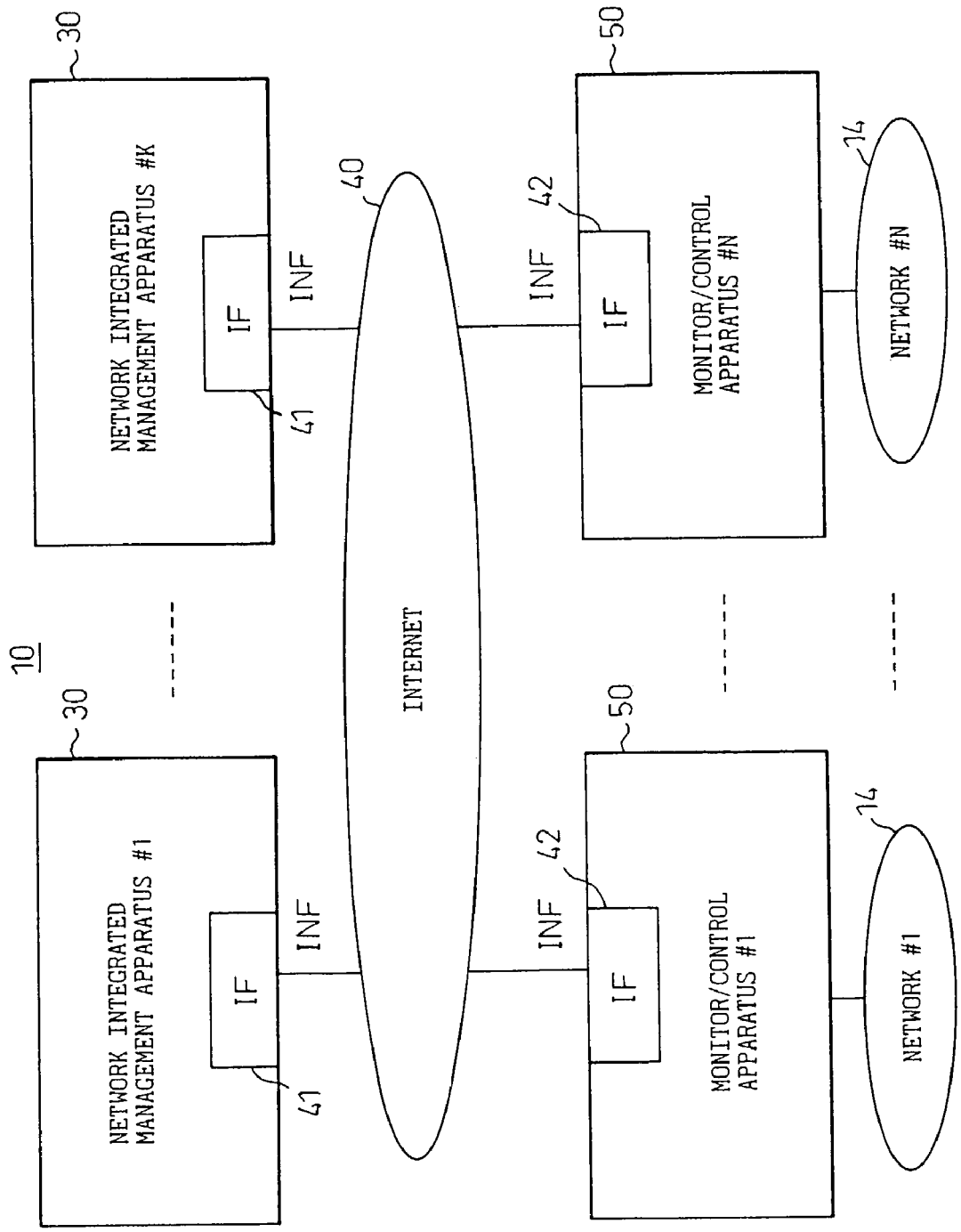
FIG. 1 is a view of the basic configuration of a network integrated management system according to the present invention.

FIG. 1 is a view of the basic configuration of a network integrated management system according to the present invention.

In the network integrated management system 10 of the present invention shown in that figure, reference numeral 50 is at least one (1 to N number of) monitor/control apparatus having a network 14 to be monitored and controlled under it.

Reference numeral 30 is at least one (1 to K number of) network integrated management apparatus for integratedly managing a network 14 through a monitor/control apparatus 50.

Reference numerals 41 and 42 are Internet interfaces (IF) for transmitting monitor/control information INF between the monitor/control apparatuses 50 and network integrated management apparatuses 30 on the Internet 40.

The specific configurations of these network integrated management apparatuses 30 and monitor/control apparatuses 50 are explained next.

Figure 2:
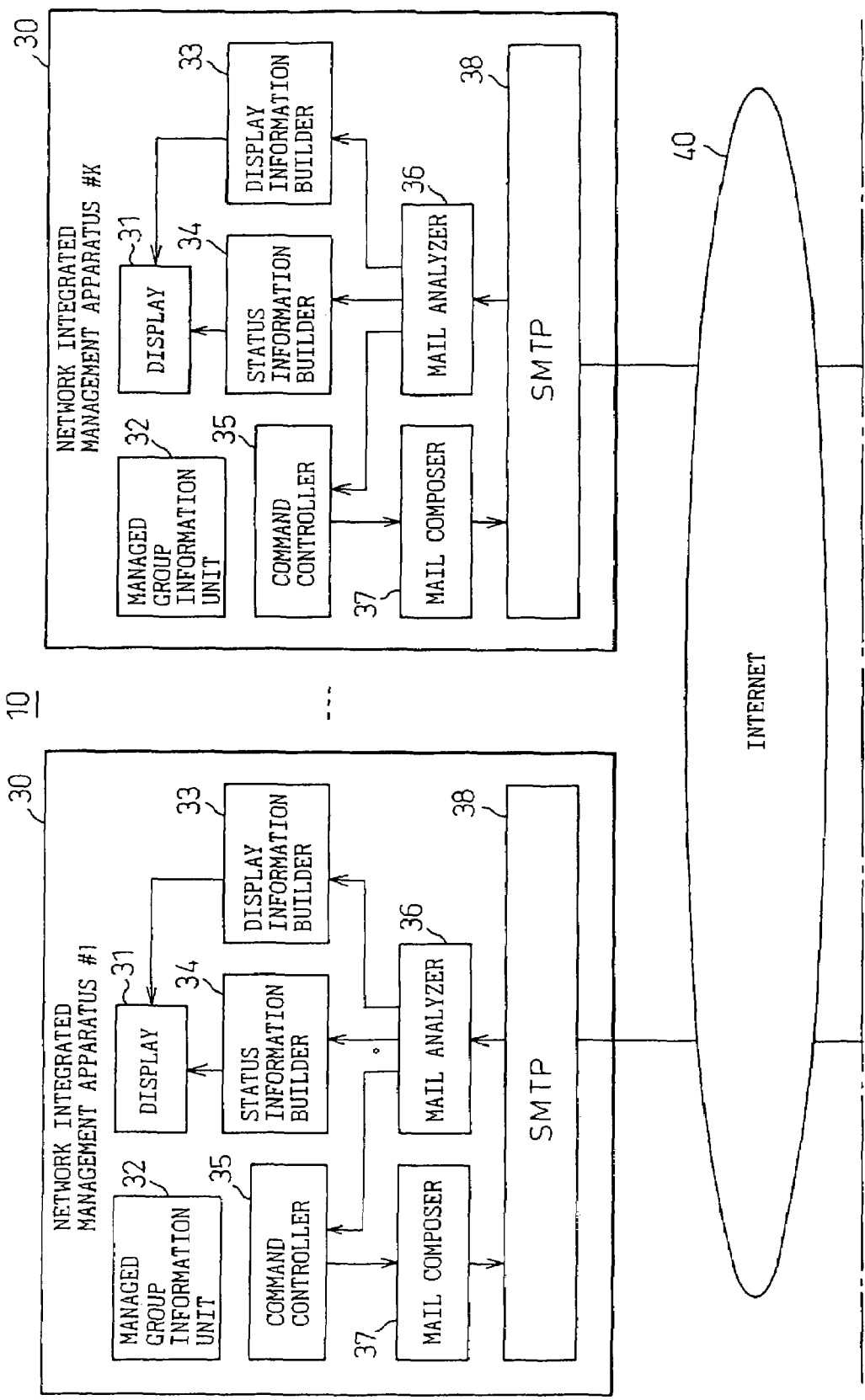
FIG. 2 is a view of a specific configuration of a network integrated management system according to the present invention (part 1)
Figure 3:
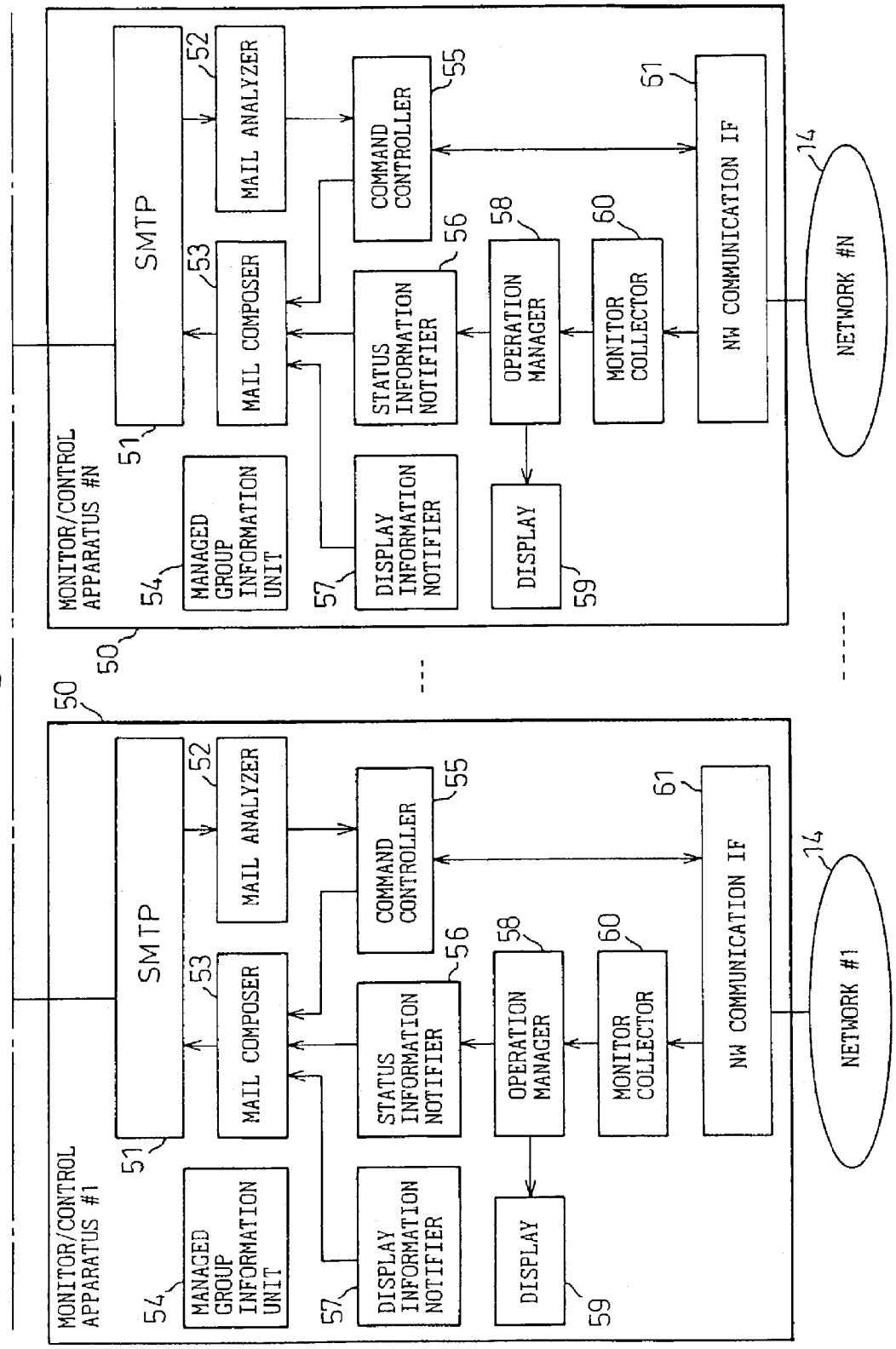
FIG. 3 is a view of a specific configuration of a network integrated management system according to the present invention (part 2)

FIG. 2 is a view of the specific configuration of a network integrated management system according to the present invention (part 1), while FIG. 3 is a similar view (part 2).

In FIG. 2, each network integrated management apparatus 30 sends and receives monitor/control information INF and manages a network 14 to be monitored and controlled through a monitor/control apparatus 50 having the network 14 under it and the Internet 40.

Further, in FIG. 3, each monitor/control apparatus 50 has a network 14 to be monitored and controlled under it and sends and receives monitor/control information INF through the Internet 40 with the network integrated management apparatus 30 for integrated management of the network 14.

Each network integrated management apparatus 30 is comprised of the components 31 to 38 shown in FIG. 2. Further, each monitor/control apparatus 50 is comprised of the components 51 to 61 shown in FIG. 3. Note that the main parts of the Internet interfaces 41 and 42 shown in FIG. 1 are SMTP units 38 and 51 (SMTP: Simple Mail Transfer Protocol).

The components (31 to 38 and 51 to 61) shown in FIG. 2 and FIG. 3 will be explained later with reference to FIG. 8 to FIG. 12 etc. Here, first, the characterizing operations (a) to (j) of the present invention will be clarified. Among these, (a) to (d) are as follows:

(a) The network integrated management apparatus 30 issues a control command as the monitor/control information INF to the monitor/control apparatus 50, while the monitor/control apparatus 50 controls the network 14 under it in accordance with the control command.

(b) The network integrated management apparatus 30 issues a control command as the monitor/control information INF to the monitor/control apparatus 50, while the monitor/control apparatus 50 controls the network 14 under it in accordance with the control command, collects the results of processing from the network, and notifies the collected information to the network integrated management apparatus 30.

(c) The network integrated management apparatus 30 issues a collection command instructing collection of status information showing the state of the network 14 as the monitor/control information INF to the monitor/control apparatus 50, while the monitor/control apparatus 50 collects status information from the network 14 under it in accordance with the collection command.

(d) The monitor/control apparatus 50 collects status change information showing a status change when there is a change in status in the network 14 under it and notifies the status change information to the network integrated management apparatus 30.

Referring to FIG. 2 and FIG. 3, in the network integrated management system 10 of the present invention, the network integrated management apparatus 30 and the monitor/control apparatus 50 are connected through the Internet 40. The network integrated management apparatus 30 and the monitor/control apparatus 50 activate a mail server (see 66 in FIG. 7).

The network integrated management apparatus 30 composes a control message at a mail composer 37 of the network integrated management apparatus 30 when an operator issues a control command (see above (a) and (b)) to a network 14 for maintenance or instructs collection of the network status (see above (c)) and sends the control message by e-mail to the monitor/control apparatus 50 in charge of the network 14 to be controlled. The monitor/control apparatus 50 analyzes the message in the received mail at its mail analyzer 52 and produces a command format at a command controller 55. Further, it issues this as a command to the network 14.

When the monitor/control apparatus 50 receives processing results of collecting network status information and status changes of the network from the network 14, the apparatus 50 converts it to data at a command controller 55 or status information notifier 56. Further, it composes a notification message at the mail composer 53 and notifies this by e-mail to the network integrated management apparatus 30 (see above (d)).

The network integrated management apparatus 30 receiving this analyzes the message in the received mail at its mail analyzer 36 and notifies the result of processing to a command controller 35. If this notification is of network status change information, a status information builder 34 converts the network status information to display information and displays it at a display 31.

Next, the previously mentioned characterizing operations (e) and (f) will be explained. (e) and,(f) are as follows:

(e) The network integrated management apparatus 30 designates at least one network 14 able to be placed under its control and manages the designated network through the corresponding monitor/control apparatus 50., (f) The monitor/control apparatus 50 is managed by at least one network integrated management apparatus 30.

Referring to FIG. 2 and FIG. 3, a network integrated management apparatus 30 has a managed group information unit (32 in FIG. 2) for managing at least one monitor/control apparatus 50 under it, while a monitor/control apparatus 50 has such a unit (54 in FIG. 3) for managing at least one network integrated management apparatus 30 to which the apparatus 50 belongs. In the managed group information unit, destination mail addresses for each notification information has been registered and the unit can simultaneously send out a notification information to a plurality of destinations.

Further, the previously mentioned characterizing operations (g) and (h) will be explained. (g) and (h) are as follows:

(g) When updating the monitor/control objects (node apparatuses 65 in FIG. 4) in a network 14 under a monitor/control apparatus 50, the monitor/control apparatus 50 notifies the updated network management range information to the network integrated management apparatus 30. The network integrated management apparatus 30 automatically updates the network management range information in this network integrated management apparatus and updates the status display of that network 14 in accordance with this.

(h) When a monitor/control object is added due to update of the monitor/control object, the network integrated management apparatus 30 issues a notification request for requesting notification of the operating state to the added monitor/control object.

Referring to FIG. 2 and FIG. 3, when a monitor/control apparatus 50 changes the range of management of networks 14, it converts the updated display information into data at the display information notifier 57 and composes a network management information message at the mail composer 53. It then mails this to the network integrated management apparatus 30.

The network integrated management apparatus 30 receiving this analyzes the message in the received mail at the mail message analyzer 36, converts this to the display format for its display at the display information builder 33, automatically changes the management range information of the network 14, and redisplays the result at the display 31.

Further, the previously mentioned characterizing operations (i) and (j) will be explained. (i) and (g) are as follows. (i) and (j) also relate to the above management range.

(i) When a monitor/control apparatus 50 itself is added, that monitor/control apparatus 50 notifies new network management range information to the network integrated management apparatus 30. The network integrated management apparatus 30 automatically updates the network management range information in the network integrated management apparatus in accordance with this and updates the status display of the network 14.

(j) A first network integrated management apparatus (for example, 30#1 in FIG. 2) remotely controls a network (14#N in FIG. 3) managed by a second network integrated management apparatus (for example, 30#K in FIG. 2) through the Internet 40 and a monitor/control apparatus 50#N having the network 14#N under it, based on management information of that network managed by the second network integrated management apparatus. Due to this, the system as a whole can be operated flexibly.

A specific example relating mainly to (g) and (i) among the above characterizing operations will be shown next with reference to the drawings.

FIG. 4 is a view of a specific example of display at displays 31 and 59 in FIG. 2 and FIG. 3 (part 1), while FIG. 5 is a similar view (part 2).

Note that in these figures, for simplification, a single network integrated management apparatus 30 and two monitor/control apparatuses (#1, #2) 50 are shown.

The status information of the networks (NW-1 and NW-2) under the monitor/control apparatuses 50#1 and 50#2 are shown as the patterns P1 and P2 in FIG. 5 and are displayed on the displays 59#1 and 59#2. Note that in the figures, the square blocks 65 show the main monitor/control objects, that is, node apparatuses.

Each display 59 concentratedly displays, as the display information, "faults" and "status changes". In this case, the parts concerned flash or are lit up red. Log information is also displayed.

The status information and display information at the monitor/control apparatuses are displayed as they are at the display 31 of the network integrated management apparatus 30 (FIG. 4).

A specific example relating to mainly (e) and (f) in the above characterizing operations will be explained next referring to the figures.

FIGS. 6(A), (B), and (C) are views of specific examples of the contents of various lists stored in tables in the managed group information unit.

(A) and (B) show lists in the managed group information unit 54 loaded as tables in the monitor/control apparatus 50, while (C) shows a list in the managed group information unit 32 loaded as a table in the network integrated management apparatus 30.

The list of FIG. 6(A) stores master addresses showing to which network integrated management apparatus (master) 30 a notification relating to a status change ("status change notification" in the figure) should be sent when there is such a notification from a node apparatus 65. The same applies to the "display information notification", "network management range change notification", etc. in the figure.

The list of FIG. 6(C) enables the monitor/control apparatuses under an apparatus, such as a network integrated management apparatus (for example 30#1), to be managed in units of groups. For example, simultaneous control of the monitor/control apparatuses registered as a group 2 is possible by "group broadcast transmission". Control of a monitor/control apparatus not belonging to any group is inhibited.

Further, the list of FIG. 6(B) shows to which groups a corresponding monitor/control apparatus belongs. When looking at one monitor/control apparatus (for example, 50#2), that apparatus belongs to groups 1, 2, 3, and 4 and will therefore accept a control command from only the network integrated management apparatuses belonging to that group and will not accept a control command from other groups and other network integrated management apparatuses.

Note that the groups are determined in advance at the time of start up of the system 10. Alternatively, when an apparatus 50 or 30 is added, the groups are determined at that time.

Figure 7:
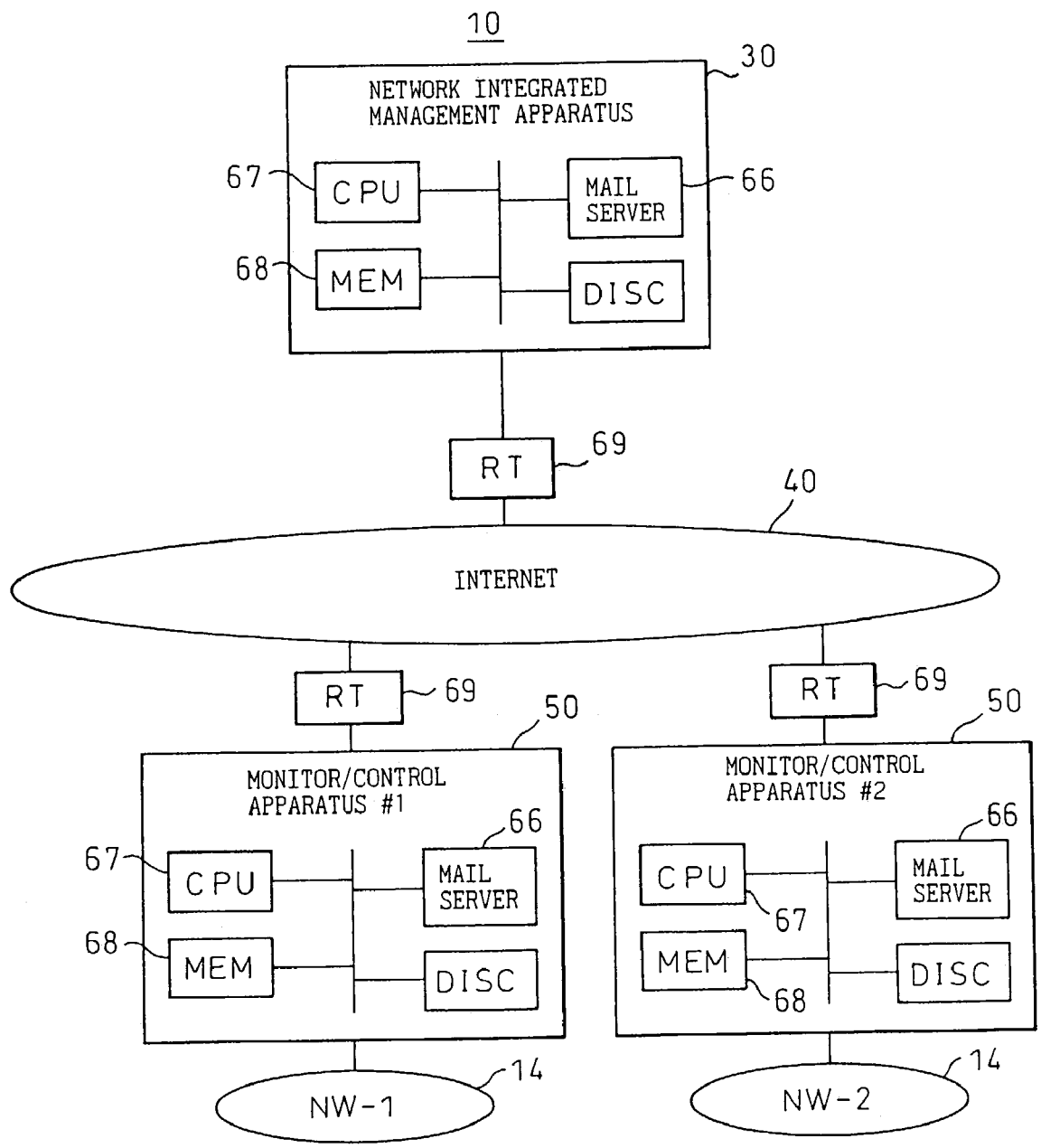
FIG. 7 is a view of the main hardware configuration of a network integrated management system according to the present invention.

FIG. 7 is a view of the main hardware configuration of a network integrated management system according to the present invention. Note that components 10, 30, 40, 50, and 14 are as already explained. Further, for simplification, a single apparatus 30 and two apparatuses 50 are shown.

The network integrated management apparatus 30 and the monitor/control apparatuses 50 ate each provided with a mail server 66 and the server 66 transfers monitor/control information (INF) through the Internet 40 via routers (RT) 69.

Each of these apparatuses (30, 50) is provided with a computer (CPU) 67 and a recording medium (MEM, DISC) 68 cooperating with the mail server 66. The computer 67 executes processing etc. relating to the aforementioned characterizing operations of the present invention, while the recording medium 68 stores a program for that purpose. The main processing to be executed by the computer 67 with the computer-readable recording medium 68 storing the program is shown in the following 1) to 3):

1) Processing in the network integrated management apparatus 30 for issuing a control command to a monitor/control apparatus 50 as monitor/control information and processing in the monitor/control apparatus 50 for controlling a network 14 under it in accordance with the control command.

2) Processing in a monitor/control apparatus 50 for controlling a network 14 under it in accordance with the above control command, processing for collecting results of processing in accordance with the control command from the network 14, and processing for notifying the collected information to the network integrated management apparatus 30.

3) Processing in the network integrated management apparatus 30 for issuing a collection command instructing collection of status information showing the state of a network 14 to the monitor/control apparatus 50 as monitor/control information and processing in the monitor/control apparatus 50 for collecting status information from the network 14 in accordance with that collection command.

Above, the configuration and characterizing operations of the system 10 according to the present invention were explained. Next, specific examples of the overall operation will be explained.

[Case of Controlling Network by Operator]

Figure 8:
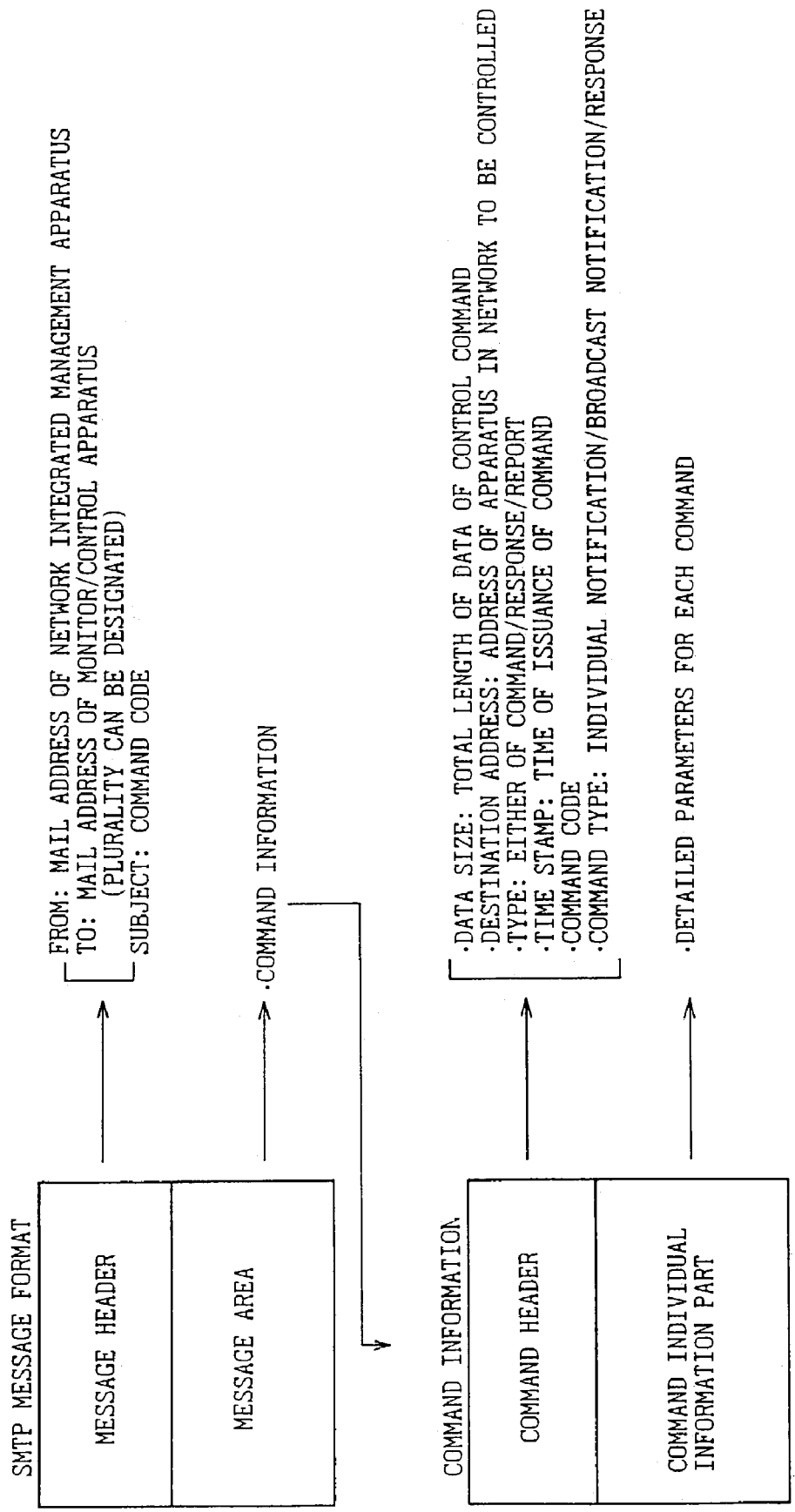
FIG. 8 is a view of a first example of an SMTP message format.

FIG. 8 is a view of a first example of an SMTP message format, while

Figure 9:
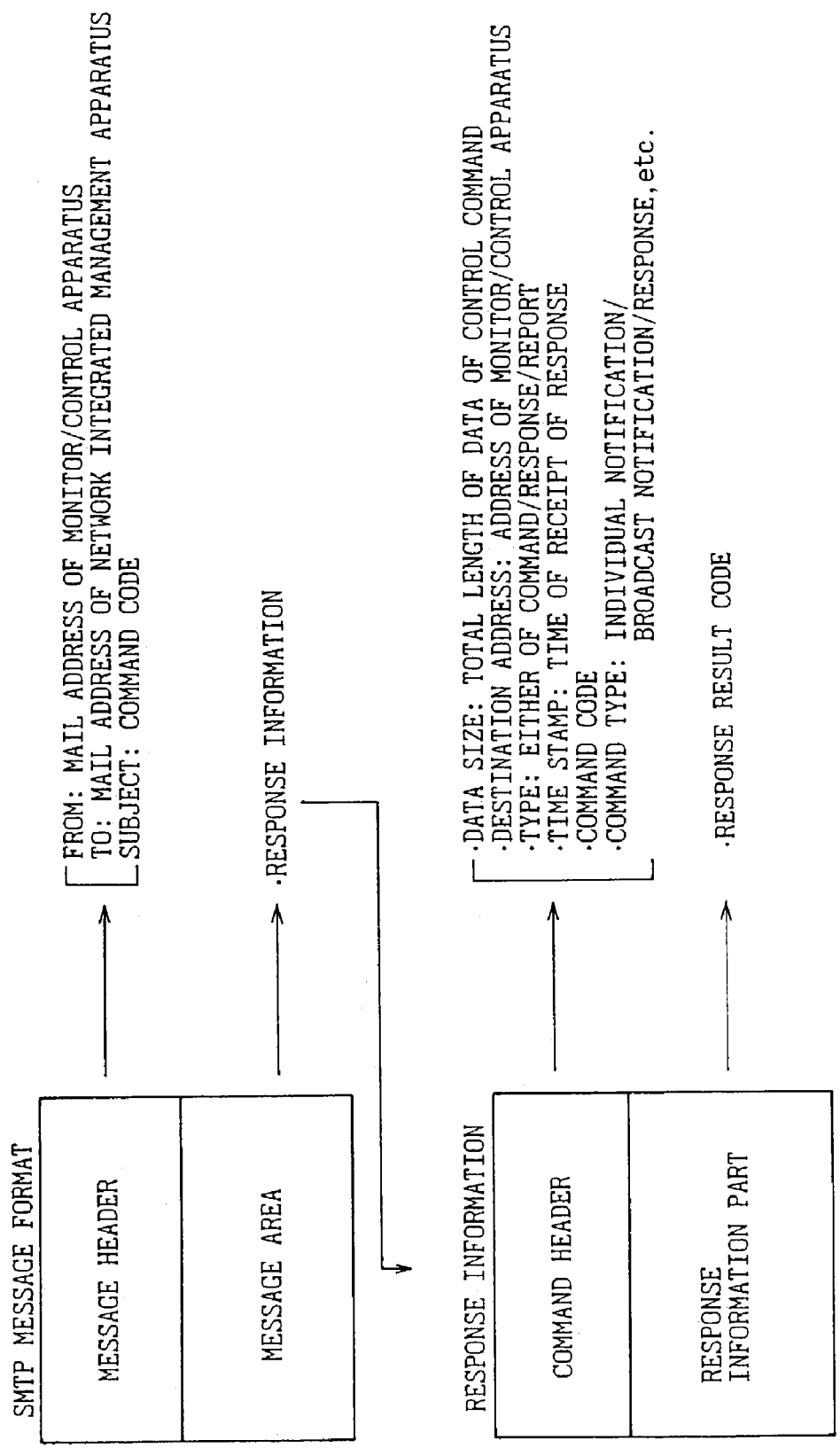
FIG. 9 is a view of a second example of an SMTP message format.

FIG. 9 is a view of a second example of an SMTP message format.

The above case will be explained below while referring to FIG. 8 and FIG. 9.

<1> The operator issues the above control command from the network integrated management apparatus 30 designating any of the networks 14. The command controller 35 searches for the mail address of the monitor/control apparatus 50 installed at the network and notifies it to the mail composer 37.

<2> The mail composer 37 sets the information in the SMTP message header format (format at the time of issuance of command) shown in FIG. 8, sets the command information prepared at the command controller 35 in the message area after the message header, and sends the message by the SMTP.

<3> The monitor/control apparatus 50 reads the destination address of the received mail at the mail analyzer 52, checks whether the mail is addressed to it, and discards the mail if not addressed to it. When addressed to it, it reads the sender host name or the command code set in the subject and notifies the content of the message area to the command controller 55.

<4> The command controller 55 calls up the processing corresponding to the command code, issues that processing command to the destination address in the command header, and waits for a response, regarding the results of processing of the command, from the monitor/control object (node apparatus 65).

When receiving the response, it prepares response information and notifies it to the mail composer 53.

<5> The mail composer 53 sets the information in the SMTP message header format (format at the time of issuing response) shown in FIG. 9, sets the response information prepared by the command controller 55 in the message area after the message header, and sends the message to the apparatus 30 side by the SMTP unit 51 (above-mentioned "notification").

<6> The network integrated management apparatus 30 receiving the mail reads the destination address of the received mail at the mail analyzer 36, checks whether the mail is addressed to it, and discards the mail if not addressed to it. When addressed to it, it reads the sender host name or the code set in the subject and notifies the content of the message area to the command controller 35.

<7> The command controller 35 notifies the message corresponding to the results of the response to the operator if a command code is issued by itself.

[Case of Status Notification from Network]

Figure 10:
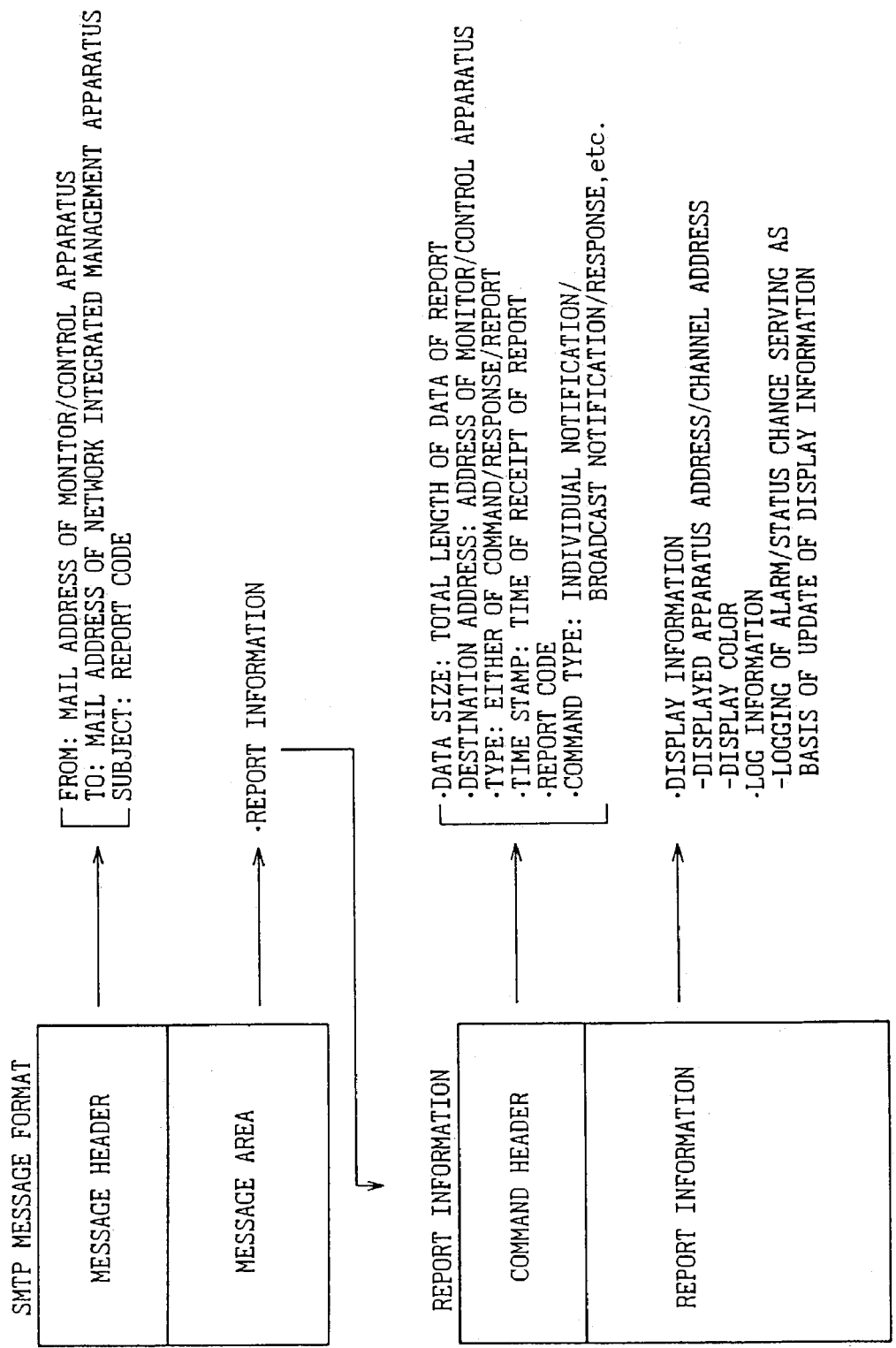
FIG. 10 is a view of a third example of an SMTP message format.

FIG. 10 is a view of a third example of the SMTP message format.

<1> When a status change occurs in a network 14, the apparatus 65 in the network 14 notifies the monitor/control apparatus 50 of the status change as a report. The monitor/control apparatus 50 updates the display state of the display 59 and notifies the status change to the status information notifier 56 through the monitor collector 60 and the operation manager 58.

<2> The status information notifier 56 prepares report information (above-mentioned "notification") comprised of the display items shown in FIG. 10 and the log information in units of apparatuses (65) in the network 14 and transfers it to the mail composer 53.

<3> The mail composer 53 sets the information in the SMTP message header format (format at time of notification of report) shown in FIG. 10, sets the report information prepared by the status information notifier 56 at the message area after the message header, and sends the message to the apparatus 30 side by the SMTP unit 51.

<4> The network integrated management apparatus 30 receiving the mail reads the destination address of the received mail at the mail analyzer 52, checks whether the mail is addressed to it, and discards the mail if not addressed to it. When addressed to it, it reads the sender host name or the code set in the subject and notifies the content of the message area to the status information builder 33 if it is a report.

<5> The status information builder 33 checks if the address is of an apparatus 65 or channel in the network 14 within the management range by the apparatus 30, based on the display information in the report and, if it is, updates the status display of the network and the display of the concentrated states.

[Case of Change of Network Management Range]

Figure 11:
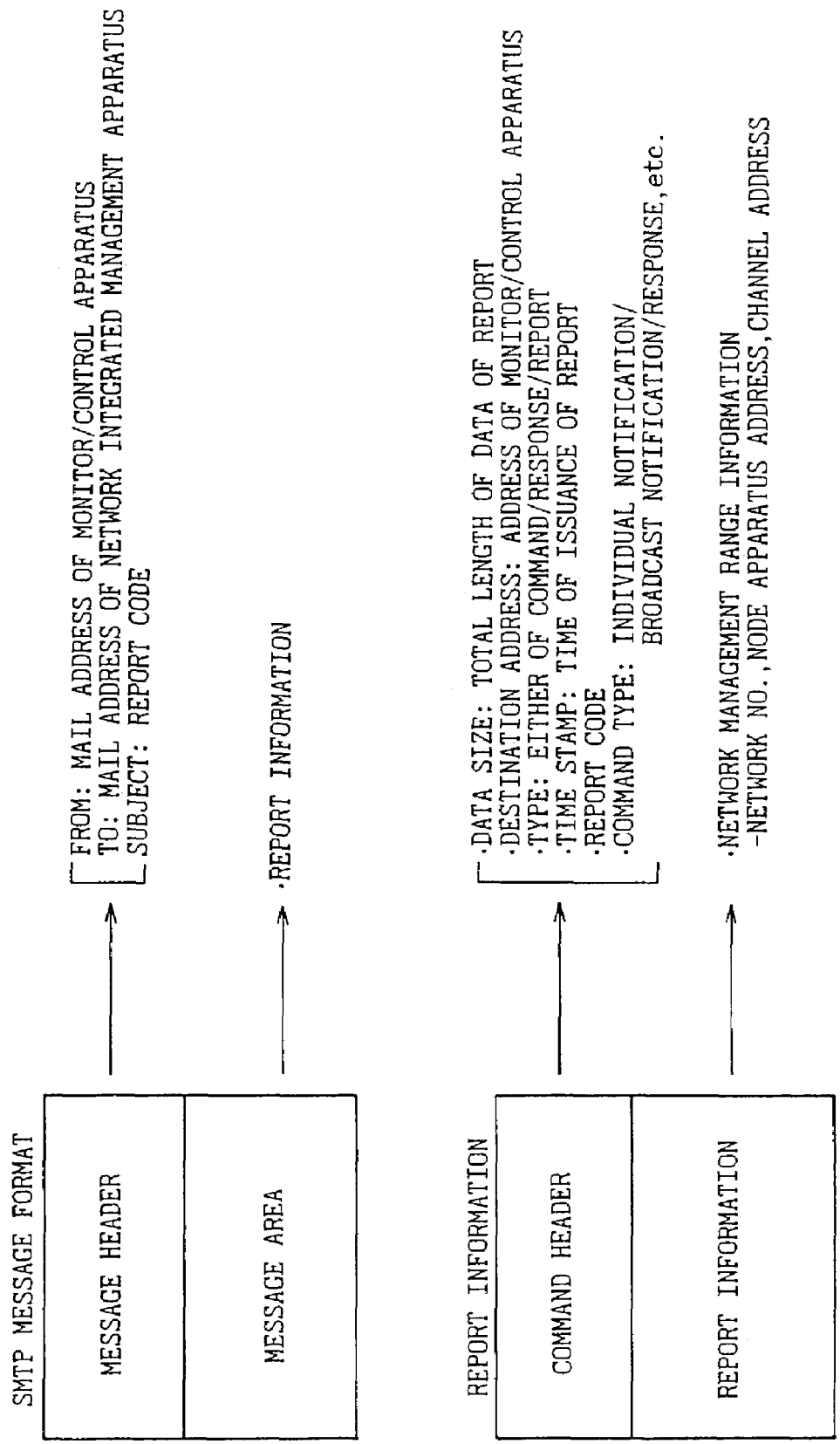
FIG. 11 is a view of a fourth example of an SMTP message format.

FIG. 11 is a view of a fourth example of the SMTP message format.

<1> When a node apparatus 65 is added in a network (NW-1) 14 and the network management range of the monitor/control apparatus (#1) 50 is updated, the display information notifier 57 prepares report information comprised of the updated new network management range information and content shown in FIG. 11 and transfers it to the mail composer 53.

<2> The mail composer 53 sets the information in the SMTP message header format (format at the time of notification of report) shown in FIG. 11, sets the report information prepared at the display information notifier 56 in the message area after the message header, and sends the message to the apparatus 30 side by the SMTP unit 51.

<3> The network integrated management apparatus 30 receiving the mail from the SMTP unit 51 reads the destination address of the received mail at the mail analyzer 36, checks whether the mail is addressed to it, and discards the mail if not addressed to it. When addressed to it, it reads the sender host name or the code set in the subject and, if it is a report, notifies the content of the message area to the display information builder 33.

<4> The display information builder 33 updates the network management range information, managed for each network number, based on the network management range information in the report and redisplays it on the display 31. For a newly added node apparatus 65, it issues a node operation status request command to the monitor/control apparatus of that network and requests report information on the state of the node apparatus. Further, it displays the state on the display 31 based on the report information.

[Monitoring of Monitor/Control Apparatus]

Figure 12:
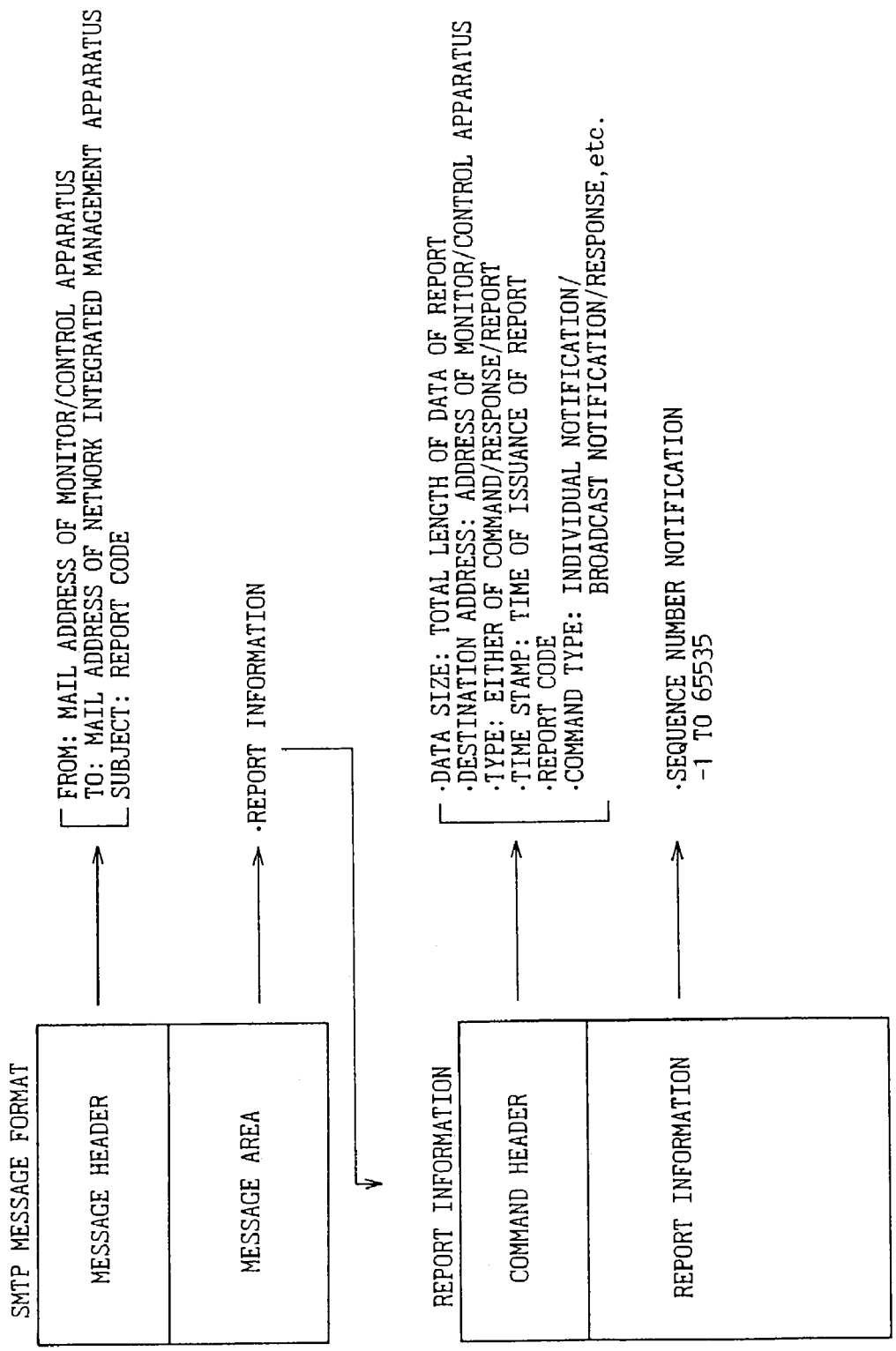
FIG. 12 is a view of a fifth example of an SMTP message format.

FIG. 12 is a view of a fifth example of the SMTP message format.

<1> The monitor/control apparatus 50 periodically issues, in addition to the various information explained above, report information added with a sequence number to the network integrated management apparatus 30.

<2> The network integrated management apparatus 30 sends the above report information to the status information builder 34. The status information builder 34 checks the sequence number in order to confirm whether or not the report information has been notified in numerical order from the apparatus 50. If it has not been notified in numerical order or if report information has not been notified within a predetermined period, it issues a sequence number notification request to the monitor/control apparatus 50. If still not being notified in numerical order even after issuing this request, it judges that there is an abnormality in the network 14 as a whole, including that monitor/control apparatus, and displays "abnormal" as the status display. Further, if report information is not notified within a predetermined period, it is deemed that the network has been removed and thus, the network is disregarded from the monitor/control objects, and thereafter, it is not monitored or controlled any further.

<3> When report information is again notified from a once removed network, the apparatus 30 issues a network management range information request to the monitor/control apparatus 50 and acquires the related network management range information. Further, the apparatus 30 issues a node operation status request and restarts the status display at the display 31.

Designating the

[Case of Controlling Network by Operator] as the mode 1,

[Case of Status Notification from Network] as the mode 2,

[Case of Change of Network Management Range] as the mode 3, and

Figure 13:
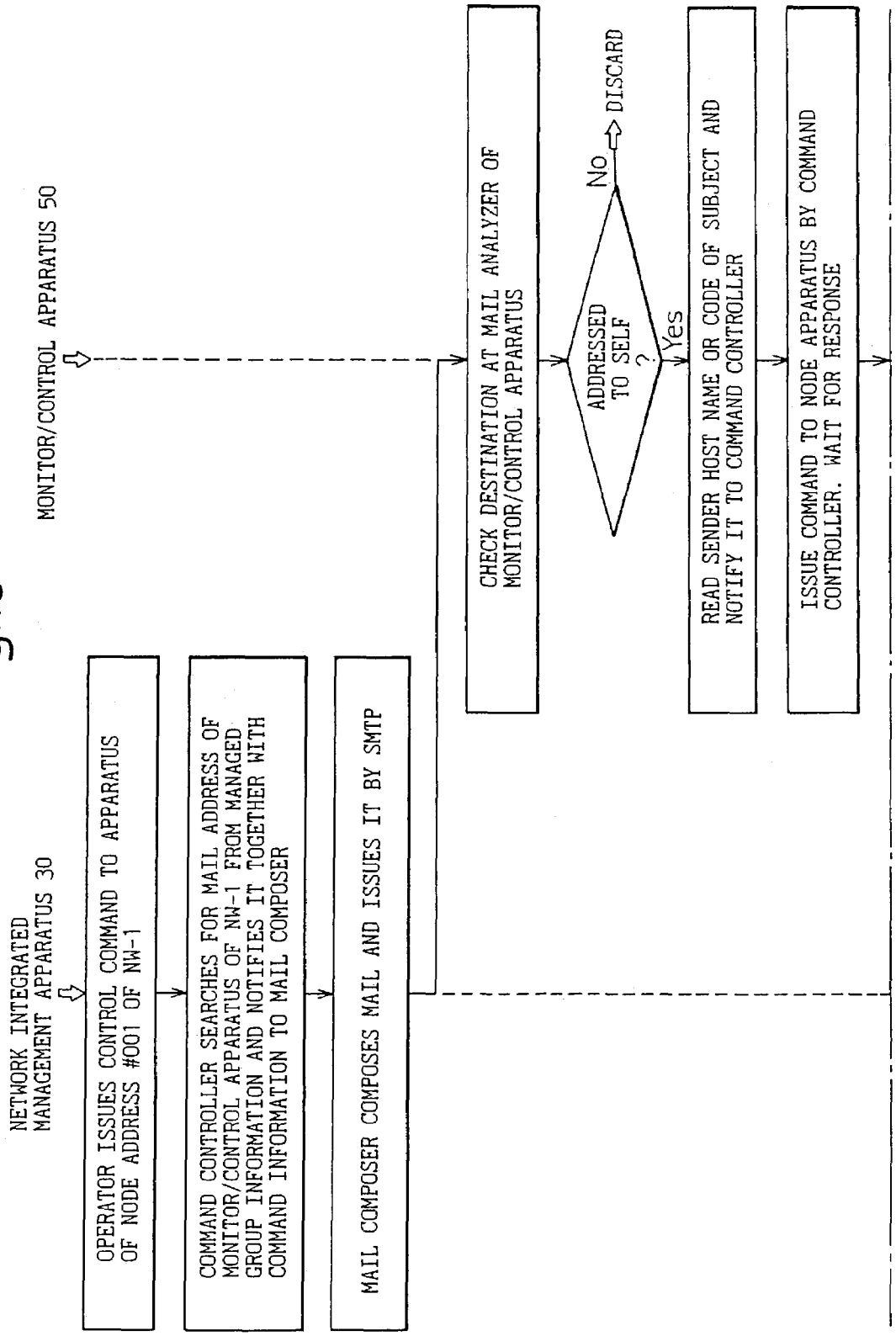
FIG. 13 is a flow chart of operation under the mode 1 (part 1)

[Case of Monitoring of Monitor/Control Apparatus] as the mode 4, the operation under each mode will be explained in a more easily understandable manner by flow charts and/or sequence charts below:

FIG. 13 is a flow chart of the operation under the mode 1 (part 1), while

Figure 14:
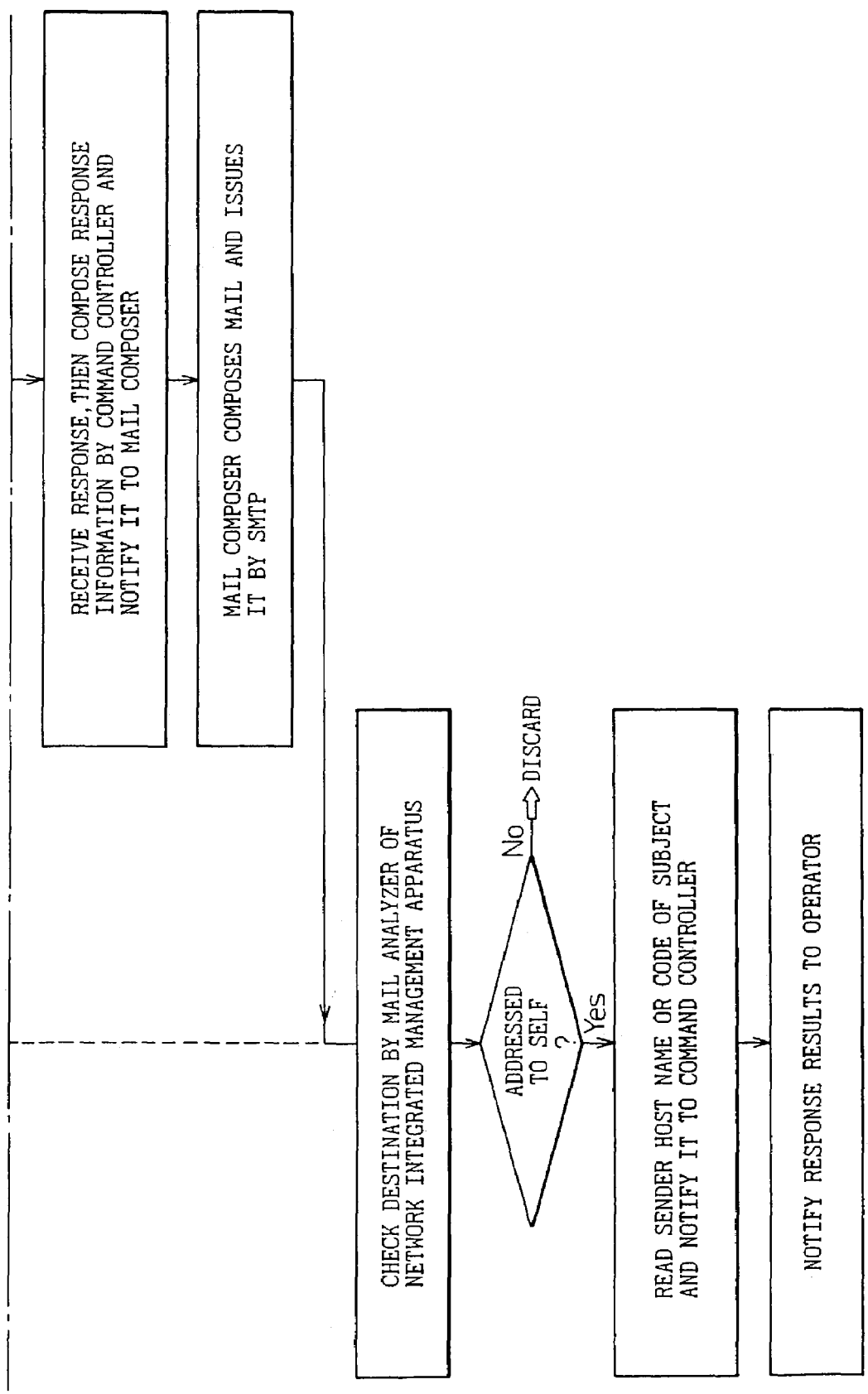
FIG. 14 is a flow chart of operation under the mode 1 (part 2)
Figure 15:
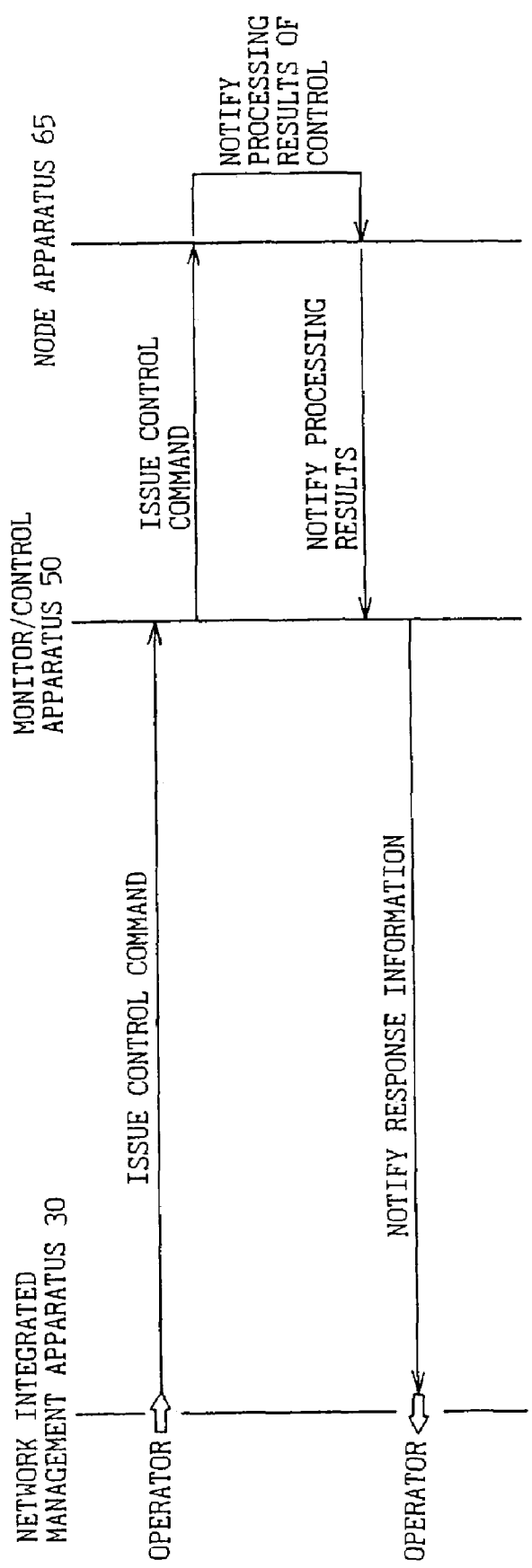
FIG. 15 is a sequence chart of processing among apparatuses under the mode 1.

FIG. 14 is a similar flow chart (part 2). Further,

FIG. 15 is a sequence chart of the processing among apparatuses under the mode 1.

Note that the contents of the steps shown in FIG. 13 and FIG. 14 are substantially the same as the contents of the already explained [Case of Controlling Network by Operator]. Further, the processing of FIG. 15 is substantially the same as the already explained content.

Figure 16:
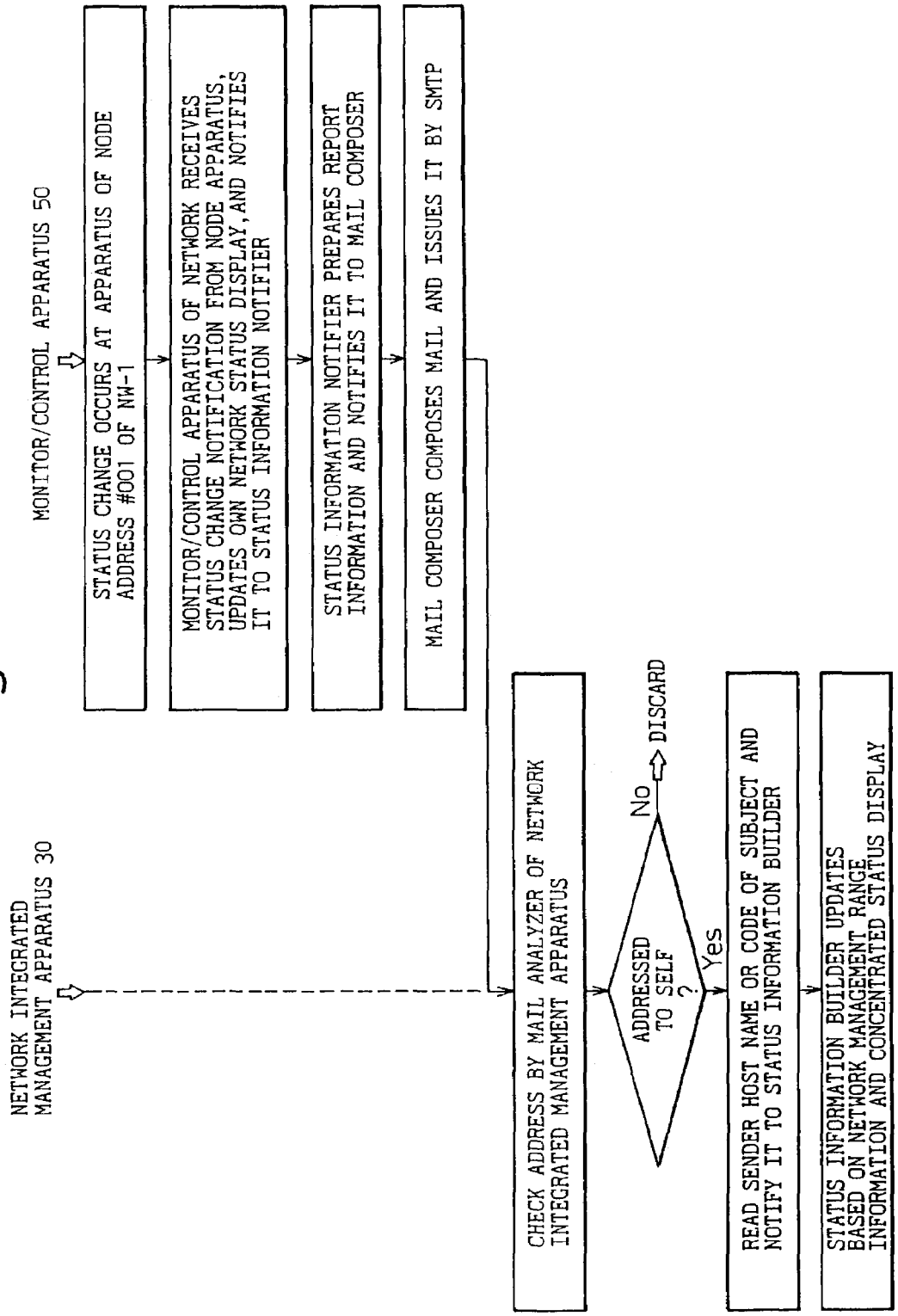
FIG. 16 is a flow chart of operation under the mode 2.
Figure 17:
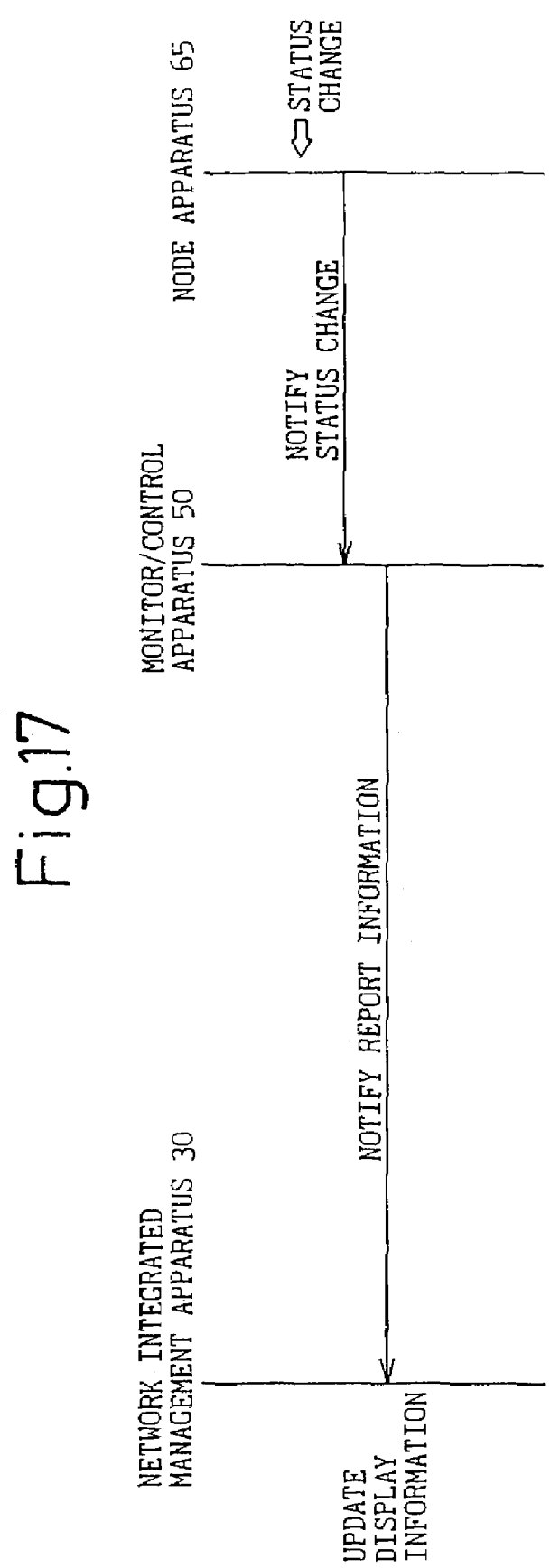
FIG. 17 is a sequence chart of processing among apparatuses under the mode 2.

FIG. 16 is a flow chart of the operation under the mode 2. Further,

FIG. 17 is a sequence chart of the processing among apparatuses under the mode 2.

Note that the contents of the steps shown in FIG. 16 are substantially the same as the contents of the already explained [Case of Status Notification From Network]. Further, the processing of FIG. 17 is substantially the same as the already explained content.

Figure 18:
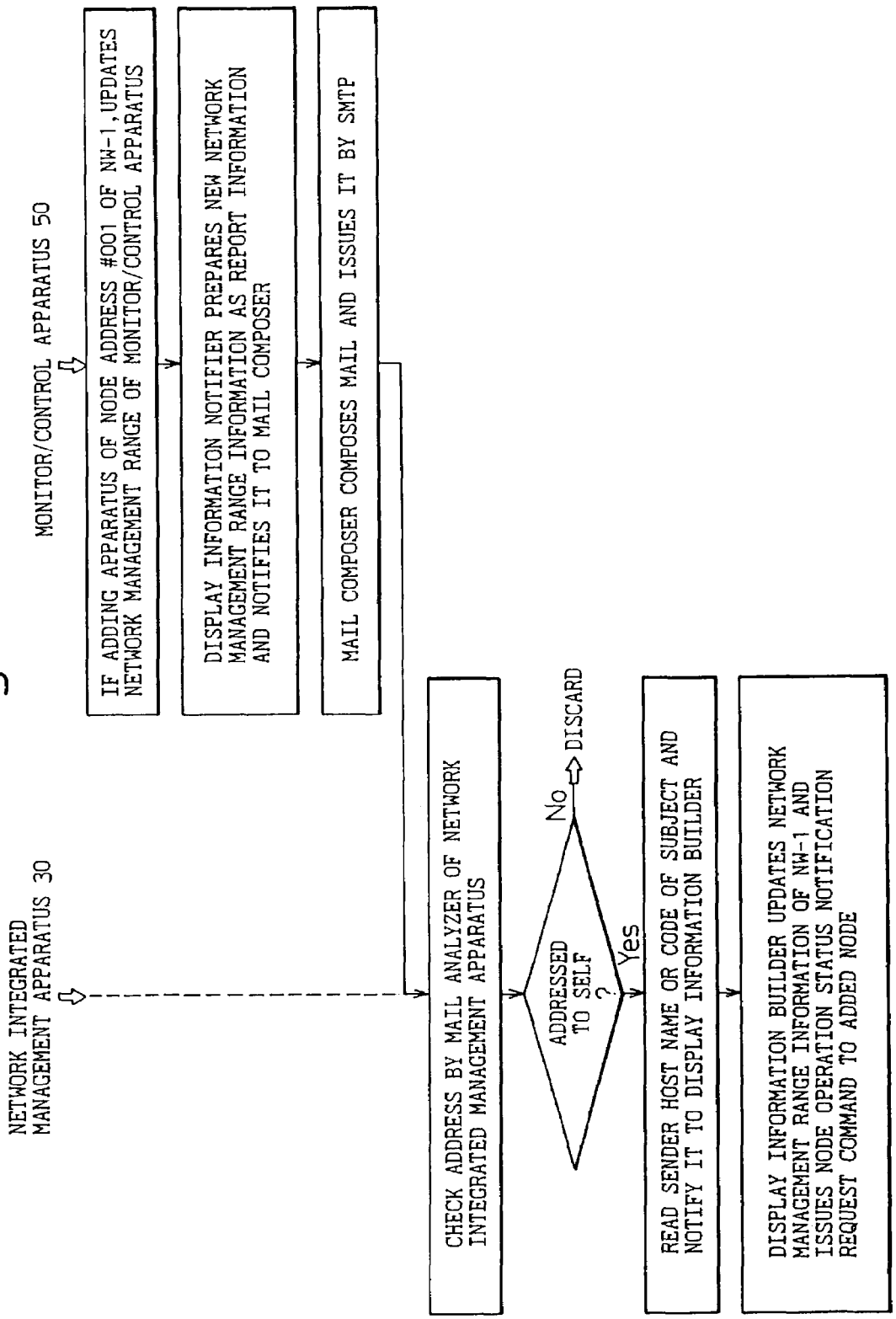
FIG. 18 is a flow chart of operation under the mode 3.
Figure 19:
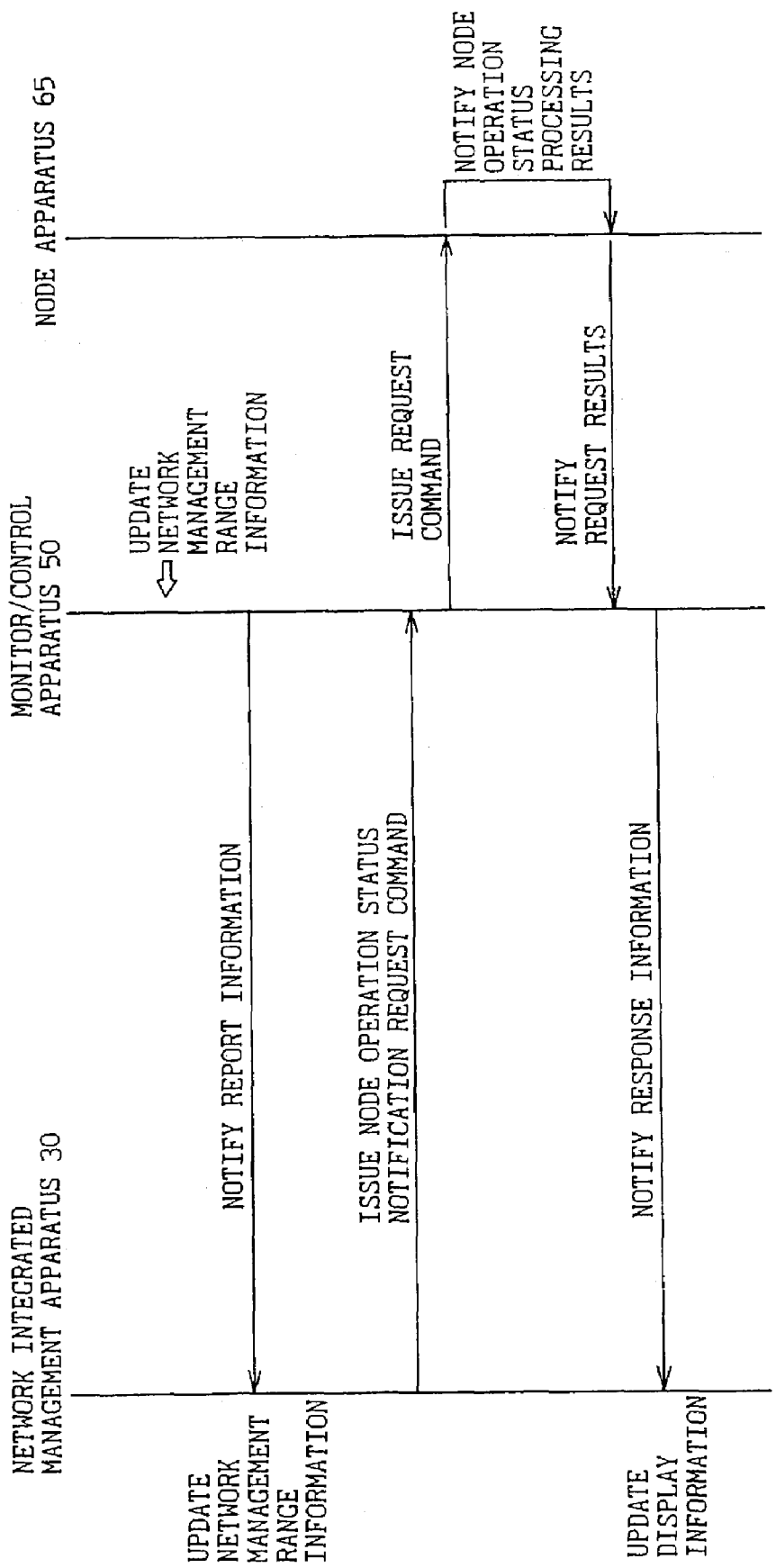
FIG. 19 is a sequence chart of processing among apparatuses under the mode 3.

FIG. 18 is a flow chart of the operation under the mode 3. Further,

FIG. 19 is a sequence chart of the processing among apparatuses under the mode 3.

Note that the contents of the steps shown in FIG. 18 are substantially the same as the contents of the already explained [Case of Change of Network Management Range]. Further, the processing of FIG. 19 is substantially the same as the already explained content.

Figure 20:
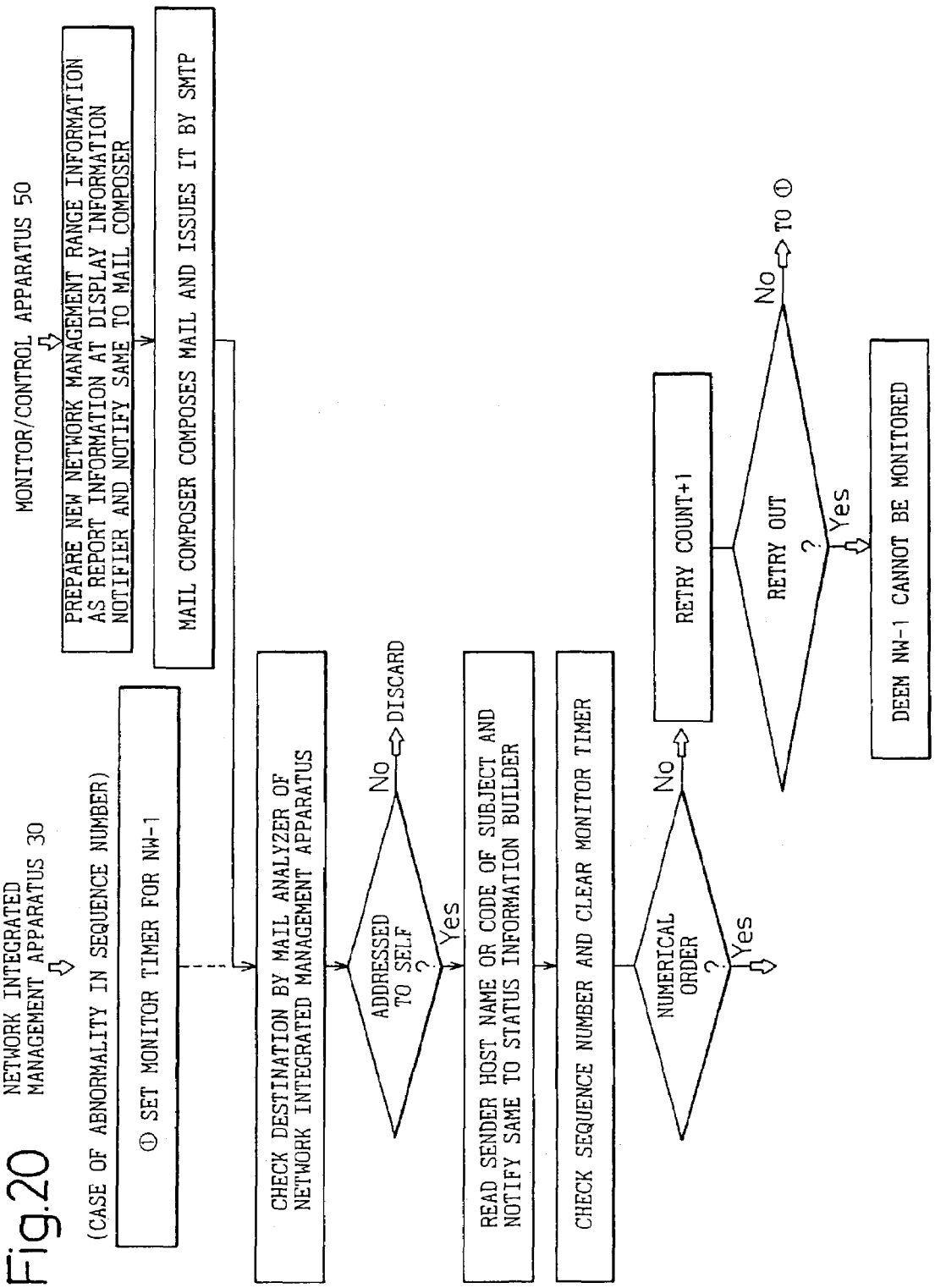
FIG. 20 is a flow chart (part 1) of operation under the mode 4.

FIG. 20 is a flow chart of the operation under the mode 4 (part 1), while

Figure 22:
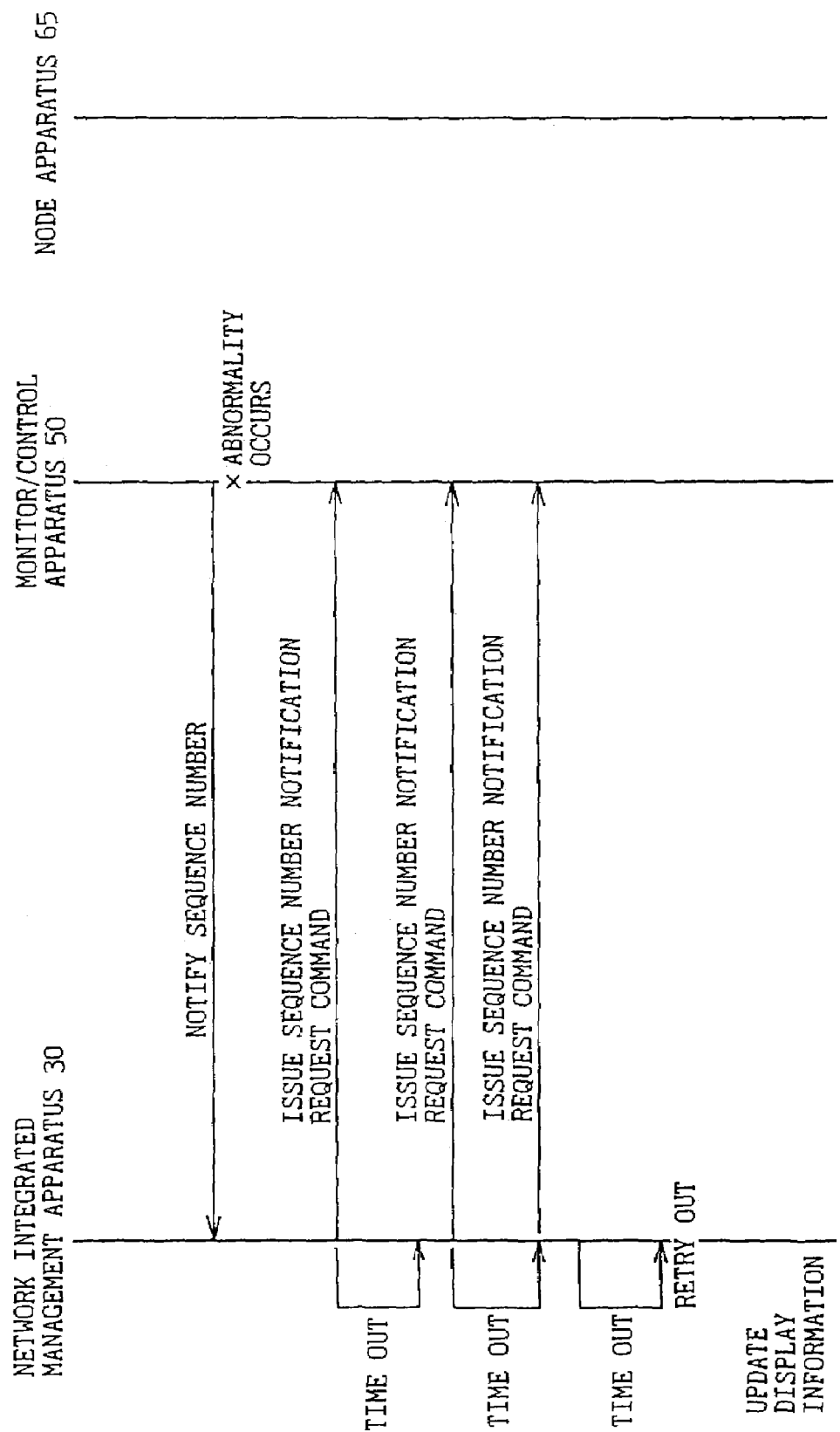
FIG. 22 is a sequence chart of processing among apparatuses under the mode 4.

FIG. 21 is a similar flow chart (part 2). Further,

FIG. 22 is a sequence chart of the processing among apparatuses under the mode 4.

In the above-mentioned [Case of Monitoring Monitor/Control Apparatus], as clarified from FIG. 20, FIG. 21 and FIG. 22, the following operations are X performed.

When not normally receiving normality check information showing if the monitor/control information is being normally sent from a monitor/control apparatus 50, the network integrated management apparatus 30 judges that an abnormality has occurred in the monitor/control apparatus 50 and the network 14 under it and changes the status display of that network in the network integrated management apparatus 30.

Further, the network integrated management apparatus 30 performs processing for retries for receiving the above normality check information. When exhausting the number of retries, it judges that the monitor/control apparatus 50 has been removed and changes the status display of that network in the network integrated management apparatus 30.

As explained above, according to the present invention, since the networks can be monitored and/or controlled from the host network integrated management apparatus, the networks can be managed more suitably and with a high degree of freedom.

Further, since a network integrated management apparatus monitors even detailed parts of the networks, high quality network management becomes possible.

Still further, since a network integrated management apparatus and a monitor/control apparatus hold identical management information, user friendliness in system management is good and the reliability is high.

Further, by adopting a system configuration incorporating the Internet, the communication costs are greatly reduced.

The invention claimed is:

1. A network integrated management system comprised of:
   at least one monitor or control apparatus having a network to be monitored and controlled under it;
   at least one network integrated management apparatus integratedly managing said network through said monitor or control apparatus; and
   an Internet interface which transfers monitor or control information between said monitor or control apparatus and said network integrated management apparatus over the Internet,
   wherein said monitor or control information is transferred according to SMTP,
   wherein said control information includes command information and response information, and said network integrated management apparatus sends said command information to said monitor or control apparatus, which sends said response information indicating processing result thereof to said network integrated management apparatus in response to said command information,
   wherein said network integrated management apparatus issues a control command as said monitor or control information to said monitor or control apparatus, and the monitor or control apparatus controls the network under it in accordance with the control command, collects results of processing from said network, and notifies the collected information to said network integrated management apparatus,
   wherein said network integrated management apparatus issues a collection command instructing collection of status information showing a state of said network as said monitor or control information to said monitor or control apparatus, and the monitor or control apparatus collects status information from the network under it in accordance with the collection command,
   wherein said network integrated management apparatus has a managed group information unit for managing at least one monitor or control apparatus under the network management apparatus,
   wherein said monitor or control apparatus has a managed group information unit for managing at least one network integrated management apparatus to which the monitor or control apparatus belongs,
   wherein, when not normally receiving normality check information showing whether the monitor or control information is being normally sent from the monitor or control apparatus, said network integrated management apparatus judges that an abnormality has occurred in the monitor or control apparatus and the network under it and changes the status display of said network in the network integrated management apparatus, and
   wherein said network integrated management apparatus performs processing for retries for receiving said normality check information and, when exhausting the number of retries, judges said monitor or control apparatus has been removed and changes the status display of said network in the network integrated management apparatus.

2. The network integrated management system as set forth in claim 1, wherein said network integrated management apparatus issues a control command as the monitor or control information to said monitor or control apparatus, and the monitor or control apparatus controls said network under it in accordance with said control command.

3. The network integrated management system as set forth in claim 1, wherein said monitor or control apparatus collects status change information showing a status change when there is a status change in the network under it and notifies the status change information to said network integrated management apparatus.

4. The network integrated management system as set forth in claim 1, wherein, when updating a monitor or control object in said network under said monitor or control apparatus, the monitor or control apparatus notifies updated network management range information to said network integrated management apparatus, and the network integrated management apparatus automatically updates the network management range information in the network integrated management apparatus and updates a status display of said network in accordance with the network.

5. The network integrated management system as set forth in claim 1, wherein, when a monitor or control apparatus is added, that monitor or control apparatus notifies new network management range information to said network integrated management apparatus, and the network integrated management apparatus automatically updates network management range information in said network integrated management apparatus in accordance with the network and updates a status display of the network.

6. The network integrated management system as set forth in claim 1, wherein, when a monitor or control object is added due to update of monitor or control objects, said network integrated management apparatus issues a notification request for requesting notification of the operating state to the added monitor or control object.

7. The network integrated management system as set forth in claim 1, wherein, when not normally receiving normality check information showing whether the monitor or control information is being normally sent from a monitor or control apparatus, said network integrated management apparatus judges that an abnormality has occurred in the monitor or control apparatus and the network under it and changes the status display of said network in the network integrated management apparatus.

8. The network integrated management system as set forth in claim 1, wherein said network integrated management apparatus designates at least one network able to be placed under its control and manages the designated network through the corresponding monitor or control apparatus.

9. The network integrated management system as set forth in claim 1, wherein said monitor or control apparatus is managed by at least one network integrated management apparatus.

10. The network integrated management system as set forth in claim 1, wherein a first network integrated management apparatus remotely controls the network managed by a second network integrated management apparatus through the Internet and said monitor or control apparatus having said network under it, based on management information of said network managed by the second network integrated management apparatus.

11. A network integrated management apparatus, comprising:

an Internet interface which transfers monitor or control information between a monitor or control apparatus and a network integrated management apparatus over the Internet, wherein the network integrated management apparatus sends and receives the monitor or control information, through the monitor or control apparatus having a network under it and the Internet, to integratedly manage the network to be monitored and controlled, wherein said monitor or control information is transferred according to SMTP, wherein said control information includes command information and response information, and said network integrated management apparatus sends said command information to said monitor or control apparatus, which sends said response information indicating processing result thereof to said network integrated management apparatus in response to said command information, wherein said network integrated management apparatus issues a control command as said monitor or control information to said monitor or control apparatus, and the monitor or control apparatus controls the network under it in accordance with the control command, collects results of processing from said network, and notifies the collected information to said network integrated management apparatus, wherein said network integrated management apparatus issues a collection command instructing collection of status information showing a state of said network as said monitor or control information to said monitor or control apparatus, and the monitor or control apparatus collects status information from the network under it in accordance with the collection command, wherein said network integrated management apparatus has a managed group information unit for managing at least one monitor or control apparatus under the network management apparatus, wherein said monitor or control apparatus has a managed group information unit for managing at least one network integrated management apparatus to which the monitor or control apparatus belongs, wherein, when not normally receiving normality check information showing whether the monitor or control information is being normally sent from the monitor or control apparatus, said network integrated management apparatus judges that an abnormality has occurred in the monitor or control apparatus and the network under it and changes the status display of said network in the network integrated management apparatus, and wherein said network integrated management apparatus performs processing for retries for receiving said normality check information and, when exhausting the number of retries, judges said monitor or control apparatus has been removed and changes the status display of said network in the network integrated management apparatus.

12. A monitor or control apparatus, comprising:

an Internet interface which transfers monitor or control information between a monitor or control apparatus and a network integrated management apparatus over the Internet, wherein the monitor or control apparatus has a network to be monitored and controlled under it and sends and receives the monitor or control information through the Internet with the network integrated management apparatus which integratedly manages the network, wherein said monitor or control information is transferred according to SMTP, wherein said control information includes command information and response information, and said network integrated management apparatus sends said command information to said monitor or control apparatus, which sends said response information indicating processing result thereof to said network integrated management apparatus in response to said command information, wherein said network integrated management apparatus issues a control command as said monitor or control information to said monitor or control apparatus, and the monitor or control apparatus controls the network under it in accordance with the control command, collects results of processing from said network, and notifies the collected information to said network integrated management apparatus, wherein said network integrated management apparatus issues a collection command instructing collection of status information showing a state of said network as said monitor or control information to said monitor or control apparatus, and the monitor or control apparatus collects status information from the network under it in accordance with the collection command, wherein said network integrated management apparatus has a managed group information unit for managing at least one monitor or control apparatus under the network management apparatus, wherein, said monitor or control apparatus has a managed group information unit for managing at least one network integrated management apparatus to which the monitor or control apparatus belongs, wherein, when not normally receiving normality check information showing whether the monitor or control information is being normally sent from the monitor or control apparatus, said network integrated management apparatus judges that an abnormality has occurred in the monitor or control apparatus and the network under it and changes the status display of said network in the network integrated management apparatus, and wherein said network integrated management apparatus, performs processing for retries for receiving said normality check information and, when exhausting the number of retries, judges said monitor or control apparatus has been removed and changes the status display of said network in the network integrated management apparatus.

13. A computer readable recording medium storing a program for making a computer execute:

processing in a network integrated management apparatus for issuing a control command to a monitor or control apparatus as monitor or control information through the Internet; and processing in the monitor or control apparatus for controlling a network under it in accordance with said control command transmitted from said network integrated management apparatus through the Internet, wherein said monitor or control information is transferred according to SMTP, wherein said control information includes command information and response information, and said network integrated management apparatus sends said command information to said monitor or control apparatus, which sends said response information indicating processing result thereof to said network integrated management apparatus in response to said command information, wherein said network integrated management apparatus issues a control command as said monitor or control information to said monitor or control apparatus, and the monitor or control apparatus controls the network under it in accordance with the control command, collects results of processing from said network, and notifies the collected information to said network integrated management apparatus, wherein said network integrated management apparatus issues a collection command instructing collection of status information showing a state of said network as said monitor or control information to said monitor or control apparatus, and the monitor or control apparatus collects status information from the network under it in accordance with the collection command, wherein said network integrated management apparatus has a managed group information unit for managing at least one monitor or control apparatus under the network management apparatus, wherein said monitor or control apparatus has a managed group information unit for managing at least one network integrated management apparatus to which the monitor or control apparatus belongs, wherein, when not normally receiving normality check information showing whether the monitor or control information is being normally sent from the monitor or control apparatus, said network integrated management apparatus judges that an abnormality has occurred in the monitor or control apparatus and the network under it and changes the status display of said network in the network integrated management apparatus, and wherein said network integrated management apparatus performs processing for retries for receiving said normality check information and, when exhausting the number of retries, judges said monitor or control apparatus has been removed and changes the status display of said network in the network integrated management apparatus.

14. The recording medium as set forth in claim 13, further including:
processing in said monitor or control apparatus for controlling the network under it in accordance with said control command;
processing for collecting results of processing in accordance with said control command from the network; and
processing for notifying the collected information to said network integrated management apparatus.

15. A computer readable recording medium storing a program for making a computer execute:
processing in a network integrated management apparatus for issuing, through the Internet, a collection command instructing collection of status information showing a state of a network to a monitor or control apparatus as monitor or control information;

processing in said monitor or control apparatus for collecting status information from the network in accordance with said collection command transmitted from said network integrated management apparatus through the Internet, wherein said monitor or control information is transferred according to SMTP, wherein said control information includes command information and response information, and said network integrated management apparatus sends said command information to said monitor or control apparatus, which sends said response information indicating processing result thereof to said network integrated management apparatus in response to said command information, wherein said network integrated management apparatus issues a control command as said monitor or control information to said monitor or control apparatus, and the monitor or control apparatus controls the network under it in accordance with the control command, collects results of processing from said network, and notifies the collected information to said network integrated management apparatus, wherein said network integrated management apparatus issues a collection command instructing collection of status information showing a state of said network as said monitor or control information to said monitor or control apparatus, and the monitor or control apparatus collects status information from the network under it in accordance with the collection command, wherein said network integrated management apparatus has a managed group information unit for managing at least one monitor or control apparatus under the network management apparatus, wherein said monitor or control apparatus has a managed group information unit for managing at least one network integrated management apparatus to which the monitor or control apparatus belongs, wherein, when not normally receiving normality check information showing whether the monitor or control information is being normally sent from the monitor or control apparatus, said network integrated management apparatus judges that an abnormality has occurred in the monitor or control apparatus and the network under it and changes the status display of said network in the network integrated management apparatus, and wherein said network integrated management apparatus performs processing for retries for receiving said normality check information and, when exhausting the number of retries, judges said monitor or control apparatus has been removed and changes the status display of said network in the network integrated management apparatus.

* * * * *